US011854067B2

(12) United States Patent
Deveaux et al.

(10) Patent No.: US 11,854,067 B2
(45) Date of Patent: Dec. 26, 2023

(54) SYSTEM FOR USER INTERACTION IN A RETAIL ENVIRONMENT

(71) Applicant: Farfetch UK Limited, London (GB)

(72) Inventors: Sandrine Deveaux, London (GB); Gavin Williams, Sevenoaks (GB); Andrew Stokoe, Amsterdam (NL); Lino Silva, Vila do Conde (PT); Gonçalo Alvarez, Lisbon (PT); José Neves, London (GB)

(73) Assignee: Farfetch UK Limited, London (GB)

( * ) Notice: Subject to any disclaimer, the term of this patent is extended or adjusted under 35 U.S.C. 154(b) by 859 days.

(21) Appl. No.: 16/603,208

(22) PCT Filed: Apr. 9, 2018

(86) PCT No.: PCT/GB2018/050942
§ 371 (c)(1),
(2) Date: Oct. 4, 2019

(87) PCT Pub. No.: WO2018/185504
PCT Pub. Date: Oct. 11, 2018

(65) Prior Publication Data
US 2021/0090156 A1 Mar. 25, 2021

(30) Foreign Application Priority Data

Apr. 7, 2017 (GB) ...................................... 1705655
Dec. 6, 2017 (GB) ...................................... 1720366

(51) Int. Cl.
*G06Q 30/00* (2023.01)
*G06Q 30/0601* (2023.01)
(Continued)

(52) U.S. Cl.
CPC ... *G06Q 30/0639* (2013.01); *G06F 16/24575* (2019.01); *G06F 16/955* (2019.01);
(Continued)

(58) Field of Classification Search
CPC .......... G06Q 30/0639; G06Q 30/0631; G06Q 30/0633; G06Q 30/0643; G06Q 10/087;
(Continued)

(56) References Cited

U.S. PATENT DOCUMENTS 6,442,530 B1 * 8/2002 Miller ................ G06Q 30/0639
705/16
9,830,638 B2 * 11/2017 Ruckart ............. G06Q 30/0639
(Continued)

FOREIGN PATENT DOCUMENTS

WO   WO 2016/200671 A1   12/2016

OTHER PUBLICATIONS

Krammer, M., Bernoulli, T., Muhic, S., Walder, U., A Smartphone Application for an Innovative User Supporting Location Based Shopping Experience, Nov. 13-15, 2012, 2012 International Conference on Indoor Positioning and Indoor Navigation, vol. 13, p. 15th. (Year: 2012).*

(Continued)

*Primary Examiner* — Allison G Wood
*Assistant Examiner* — Brittany E Bargeon
(74) *Attorney, Agent, or Firm* — Fenwick & West LLP

(57) ABSTRACT

A system for automatically determining the location of a user-specified item within a plurality of possible independent inventory systems is described where each inventory system is located in a different unique geographic location. The system comprises a user profile database comprising a plurality of user records associated with a plurality of different users; at least one of the user records comprising a list of items that are required by a corresponding user; an availability database for providing information relating to the availability of specific items at each of the plurality of inventory systems, a central server for interacting with a mobile telecommunications device. The server comprises:

(Continued)

an updating engine for regularly updating the availability database with supply or usage information received from the plurality of inventory systems; the supply or usage information regarding the number of items currently available at the location of each inventory system; and a processing engine for receiving a request from the mobile device from the location associated with one of the inventory systems, the request comprising a current location identifier and a user identifier. The processing engine is arranged to: search the user profile database for a matching user record corresponding to the user identifier; retrieve from the matching user record the list of items for that user; search the availability database using a unique identifier of each item of the list and the current location identifier to determine whether the inventory system at the current location of the mobile device has any of the items on the list; and transmit a reply to the request, the reply comprising information about which items on the user's list are present at the current location of the mobile device.

17 Claims, 22 Drawing Sheets

(51) Int. Cl.
| | | |
|---|---|---|
| *H04W 4/80* | (2018.01) | |
| *G06F 16/955* | (2019.01) | |
| *G06F 16/2457* | (2019.01) | |
| *G06Q 10/087* | (2023.01) | |
| *G07C 9/00* | (2020.01) | |

(52) U.S. Cl.
CPC ....... *G06Q 10/087* (2013.01); *G06Q 30/0631* (2013.01); *G06Q 30/0633* (2013.01); *G06Q 30/0643* (2013.01); *G07C 9/00309* (2013.01); *H04W 4/80* (2018.02); *G07C 2009/0042* (2013.01); *G07C 2009/00317* (2013.01); *G07C 2009/00769* (2013.01)

(58) Field of Classification Search
CPC .. H04W 4/80; G06F 16/955; G06F 16/24575; G07C 9/00309; G07C 2009/00317; G07C 2009/0042; G07C 2009/00769
USPC ........................................................ 705/26.9
See application file for complete search history.

(56) References Cited

U.S. PATENT DOCUMENTS

| | | | | |
|---|---|---|---|---|
| 10,325,309 | B2* | 6/2019 | Gadre | G06Q 30/0635 |
| 2002/0174021 | A1* | 11/2002 | Chu | G06Q 10/063 |
| | | | | 705/26.61 |
| 2004/0093274 | A1* | 5/2004 | Vanska | G06Q 30/0631 |
| | | | | 705/26.7 |
| 2006/0059049 | A1* | 3/2006 | Morris | G06Q 30/02 |
| | | | | 705/26.1 |
| 2006/0265294 | A1* | 11/2006 | de Sylva | G06Q 30/0603 |
| | | | | 705/28 |
| 2009/0100076 | A1* | 4/2009 | Hamilton, II | G06Q 30/0627 |
| 2009/0289775 | A1* | 11/2009 | Kubota | G06Q 10/087 |
| | | | | 340/10.6 |
| 2010/0262554 | A1* | 10/2010 | Elliott | H04W 4/024 |
| | | | | 345/173 |
| 2012/0123674 | A1* | 5/2012 | Perks | G06Q 30/0631 |
| | | | | 705/26.7 |
| 2012/0214515 | A1* | 8/2012 | Davis | H04W 4/024 |
| | | | | 455/456.6 |
| 2012/0303480 | A1* | 11/2012 | Stone | G06Q 30/00 |
| | | | | 705/26.8 |
| 2013/0080289 | A1* | 3/2013 | Roy | G06Q 20/322 |
| | | | | 705/26.8 |
| 2013/0144715 | A1* | 6/2013 | Kranzley | G06Q 30/0251 |
| | | | | 705/14.49 |
| 2013/0191246 | A1* | 7/2013 | Calman | G06Q 30/0639 |
| | | | | 705/26.9 |
| 2015/0039461 | A1 | 2/2015 | Gadre et al. | |
| 2015/0179012 | A1* | 6/2015 | Sharpe | G06Q 10/06314 |
| | | | | 340/5.28 |
| 2015/0262230 | A1* | 9/2015 | Cypher | G06F 3/04847 |
| | | | | 705/14.49 |
| 2017/0011423 | A1* | 1/2017 | Douglas | G06Q 30/0261 |
| 2017/0032290 | A1* | 2/2017 | Ford | G06Q 10/087 |
| 2018/0365754 | A1* | 12/2018 | Wall | G06Q 10/08 |
| 2019/0043002 | A1* | 2/2019 | King | G07C 9/00174 |

OTHER PUBLICATIONS

Krammer, M., Bernoulli, T., Muhic, S., Walder, U., A Smartphone Application for an Innovative User Supporting Location Based Shopping Experience, Nov. 13-15, 2012, 2012 International Conference on Indoor Positioning and Indoor Navigation, vol. 13, p. 1-6. (Year: 2012).*

PCT International Search Report and Written Opinion, dated Oct. 5, 2018, 20 Pages.

China National Intellectual Property Administration, Chinese Patent Application No. 201880035155.5, dated Feb. 15, 2023, 22 pages.

* cited by examiner

─ 38

Hello

Would you like to:

- Call the assistant
- See further information about the item?
- See other colours of the same item?
- Purchase the item?
- Arrange home delivery?
- See associated items?

Touch the option to select

Figure 9

SYSTEM FOR USER INTERACTION IN A RETAIL ENVIRONMENT

CROSS-REFERENCE TO RELATED APPLICATIONS

This application is the National Stage of International Application No. PCT/GB2018/050942, filed Apr. 9, 2018, which claims the benefit of and priority to Great Britain Patent Application Serial No. 1705655.7, filed Apr. 7, 2017, and Great Britain Patent Application Serial No. 1720366.2, filed on Dec. 6, 2017, which are incorporated by reference in their entirety.

BACKGROUND

It is frequently necessary for a retail business to operate in physical locations (such as in a high street store) and also to maintain an online interface in order to conduct a commercially viable business. It is also often the case that these two elements of a business are distinct and separate, with customer behaviours from one element having limited interaction with those in the other. Present attempts to connect the two elements often rely on customers actively requesting for such an interaction, such as by buying an item online and requesting that it be delivered to a physical store, with little of the interaction being automatic.

Similarly, a physical store experience presented to a customer can often not be made to be as bespoke as an online experience, as preferences of that customer are not presently able to be stored in the same manner as they can be online.

SUMMARY

There are presented multiple aspects of a system for providing an automatic connection between a user's behaviours in an online setting and those in a physical setting and more specifically, automatically providing a personalised experience in a physical store based on customer interactions, both physical and virtual. The system can also control the environment in which the interactions take place in order to enhance user interaction and also help the user to quickly locate items of interest and well as their save time in providing relevant availability information.

According to one aspect of the present invention, there is provided a system for automatically determining the location of a user-specified item within a plurality of possible independent inventory systems, each inventory system being located in a different unique geographic location, the system comprising: a user profile database comprising a plurality of user records associated with a plurality of different users, at least one of the user records comprising a list of items that are required by a corresponding user; an availability database for providing information relating to the availability of specific items at each of the plurality of independent inventory systems, a central server for interacting with a mobile telecommunications device, the server comprising: an updating engine for regularly updating the availability database with supply or usage information received from the plurality of independent inventory systems; the supply or usage information regarding the number of items currently available at the geographic location of each inventory system; and a processing engine for receiving a request from the mobile telecommunications device from the geographical location associated with one of the independent inventory systems, the request comprising a current location identifier and a user identifier, the processing engine being arranged to: search the user profile database for a matching user record corresponding to the user identifier, retrieve from the matching user record, the list of items for that user; search the availability database using a unique identifier of each item of the list and the current location identifier to determine whether the inventory system at the current location of the mobile telecommunications device has any of the items on the list; and transmit a reply to the request, the reply comprising information about which items on the list are present at the current location of the mobile telecommunications device.

In certain embodiments the system further comprises an item database storing a plurality of item identifiers, the item database being arranged to enable the use of keyword descriptors of an item to look up a corresponding universal identifier of that item which can be used to identify the item in any of a plurality of different local inventory systems; wherein the processing engine is configured to determine the unique identifier of an item on the list by querying the item database using keyword descriptors of the item and to retrieve the corresponding universal identifier of the item.

This feature advantageously assists in the interoperability of the different independent inventory systems.

The present embodiments also extend to a combination of a system as described above and a mobile telecommunications device being controlled by a downloaded application, wherein the downloaded application is arranged to configure the mobile telecommunications device to interact with an independent inventory system to register a current location of the mobile telecommunications device.

In another embodiment there is described a combination as described above and a remotely-configurable changing room lock. The lock comprises a communications module for communicating with the inventory system and/or the mobile telecommunications device and is arranged to be responsive to receipt of the preparation communication or a control instruction derived therefrom, to lock the changing room once the items have been placed therein, to generate a unique unlock code and to provide the unlock code for transmission back to the mobile telecommunications device, the unique unlock code being useable by the mobile device or user of the device to unlock the locked changing room to provide access to the user-selected items once the mobile device is proximate the changing room.

The present invention also extends to a method of automatically determining the location of a user-specified item within a plurality of possible independent inventory systems, each inventory system being located in a different unique geographic location, the method comprising: providing a user profile database comprising a plurality of user records associated with a plurality of different users; at least one of the user records comprising a list of items that are required by a corresponding user; providing an availability database comprising information relating to the availability of specific items at each of the plurality of independent inventory systems; interacting with a mobile telecommunications device, the interaction comprising: regularly updating the availability database with supply or usage information received from the plurality of independent inventory systems; the supply or usage information regarding the number of items currently available at the geographic location of inventory system; receiving a request from the mobile telecommunications device from the geographical location associated with one of the independent inventory systems, the request comprising a current location identifier and a user identifier; searching the user profile database for a matching user record corresponding to the user identifier;

retrieving from the matching user record the list of items for that user; searching the availability database using a unique identifier of each item of the list and the current location identifier to determine whether the inventory system at the current location of the mobile telecommunications device has any of the items on the list; and transmitting a reply to the request, the reply comprising information about which items on the user's list are present at the current location of the mobile telecommunications device.

According to another aspect, there is provided a preparation and reservation system for selecting items for close inspection in a secure changing room, the system comprising: a receiver for receiving an instruction from a mobile telecommunications device for selected items available at a store location; the receiver being arranged to display information to a store assistant regarding the selected items identified in the instruction; a changing room locking device for controlling the operation of a lock on a changing room door at the store location, the locking device being configured, subsequent to the selected items being placed in the changing room and in response to receiving an activation command, to lock the door and generate a one-time unlocking code for unlocking the locking device; and a transmitter for communicating the generated one-time unlocking code to the mobile telecommunications device for subsequent use by a user of the mobile telecommunications device to unlock the locked changing room door.

This aspect may also extend to a method of preparation and reservation of selecting items for close inspection in a secure changing room, the method comprising: receiving an instruction from a mobile telecommunications device for selected items available at a store location; displaying information to a store assistant regarding the selected items identified in the instruction; providing a changing room locking device for controlling the operation of a lock on a changing room door at the store location; receiving an activation command at the changing room locking device subsequent to the selected items being placed in the changing room and in response thereto operating the locking device to lock the door; generating a one-time unlocking code for unlocking the changing room door via the operation of the changing room locking device; transmitting the generated one-time unlocking code to the mobile telecommunications device; and unlocking the locked changing room door via the changing room locking device when the user of the mobile device or the mobile device is in close proximity to the changing room locking device and once the unlocking code has been received from the user or the user's mobile telecommunications device.

A further aspect of the present disclosure relates to an item location determining system within a geographical area of a retail store, the system comprising: a plurality of item positions determining sensors distributed about the geographical area, each of the plurality of item positions determining sensors being configured in use to detect the presence of a specific item at a sensor location and to transmit information about the item and the location within the geographical area to a mapping engine; a mapping engine for determining the locations of items within the geographical area using the information received from the item positioning sensors and for associating these locations with a floorplan of the geographical area, the floorplan including a plurality of user-accessible pathways which can be traversed to access any of the items located at an item position sensor; at least three local telecommunications beacons positioned about the geographical area in spaced-apart locations, the local telecommunications beacons being configured in use to transmit and receive location-determining information of a mobile telecommunications device provided within the geographical area; a local position determining engine operatively coupled to the plurality of local telecommunications beacons, the local positioning engine being arranged to: determine from the signals received from the plurality of local telecommunications beacons, a current position of the mobile telecommunications device within the geographical area; and provide the current position of the mobile telecommunications device within the geographical area to the mapping engine; wherein the mapping engine is configured to: receive an item location request from the mobile telecommunications device for a user-specified item and to determine the location of that item within the geographical area of the store; and transmit to the mobile telecommunications device the location of the user-specified item within the geographical area together with the current position of the mobile telecommunications device within the geographical area such that the mobile device can present on an image of the floorplan the user-specified item location, the current position of the mobile telecommunications device and a route from the current position to the location of the user-specified item along a pathway of the floorplan.

Another aspect of the present disclosure extends to an interactive routing system for use within a geographical area of a retail store, the interactive routing system comprising an item locating system as described above and a mobile telecommunications device, the mobile telecommunications device having a downloadable application for configuring operation of the device to communicate with the item locating system and to receive the location of the user-specified item within the geographical area together with the current position of the mobile telecommunications device within the geographical area; the mobile telecommunications device being configured by the downloadable application to display an image of the floorplan of the geographical area of the retail store and to present on the image of the floorplan the user-specified item location, the current position of the mobile telecommunications device and a route from the current position to the location of the user-specified item along a pathway of the floorplan.

A yet further aspect of the present disclosure is directed to a method of determining a location of an item within a geographical area of a retail store, the method comprising: detecting the presence of a specific item at a sensor location using one of a plurality of item position determining sensors distributed about the geographical area; transmitting information about the item and the location within the geographical area to a mapping engine; determining the locations of items within the geographical area using the information received from the item positioning sensors for association with a floorplan of the geographical area, the floorplan including a plurality of user-accessible pathways which can be traversed to access any of the items located at an item position sensor; using at least three local telecommunications beacons positioned about the geographical area in spaced apart locations; configuring the local telecommunications beacons in use to transmit and receive location-determining information of a mobile telecommunications device provided within the geographical area; determining from the signals received from the plurality of local telecommunications beacons, a current position of the mobile telecommunications device within the geographical area; providing the current position of the mobile telecommunications device within the geographical area to the mapping engine; receiving at the mapping engine an item location request from the mobile telecommunications device for a user-specified item; determining the location of that item within the geographical area of the store; and transmitting to the mobile telecommunications device the location of the user-specified item together with the current position of the mobile telecommunications device within the geographical area, such that the mobile device can present on an image of the floorplan the user-specified item location, the current position of the mobile telecommunications device and a route from the current position to the location of the user-specified item along a pathway of the floorplan.

BRIEF DESCRIPTION OF DRAWINGS

FIG. 9 shows an example interface presented on the interactive mirror device of FIG. 7;

DETAILED DESCRIPTION

Software Application

One aspect of the present embodiments is directed toward a software interface which allows for automatic interrelation between a user's online preferences and the physical store environment which is presented to them. Presently, a user will need to provide a physical location with explicit instruction that they intend to arrive at a particular time in order to modify the environment (such as by having items in store ready for collection). To that end, there is provided a software application (hereby referred to as the 'Store of the Future Platform (SFP) application') suitable for installation in a mobile telecommunications device, such as a smartphone or a tablet computer. It is to be understood that the name 'SFP' is used for ease of reference that is not intended as being in any way limiting, and that the software application referred to herein may in fact have a plurality of names. In some embodiments, SFP may also be used to refer to a computing platform including at least one processor upon which multiple software applications may be run. The platform may encompass software applications, back-end services and any hardware devices associated with the functionality of the applications and back-end services. These hardware devices may include hardware elements discussed in greater detail below The SFP application may provide information relating to the user of the application and also information about the physical store which they are in (for example, a floorplan of the store in question). The application may also present a subset of user information which is determined to be relevant to their location, for example, only displaying preferences relating to the store which they are in, as opposed to all stores which they have visited.

Figure 1:
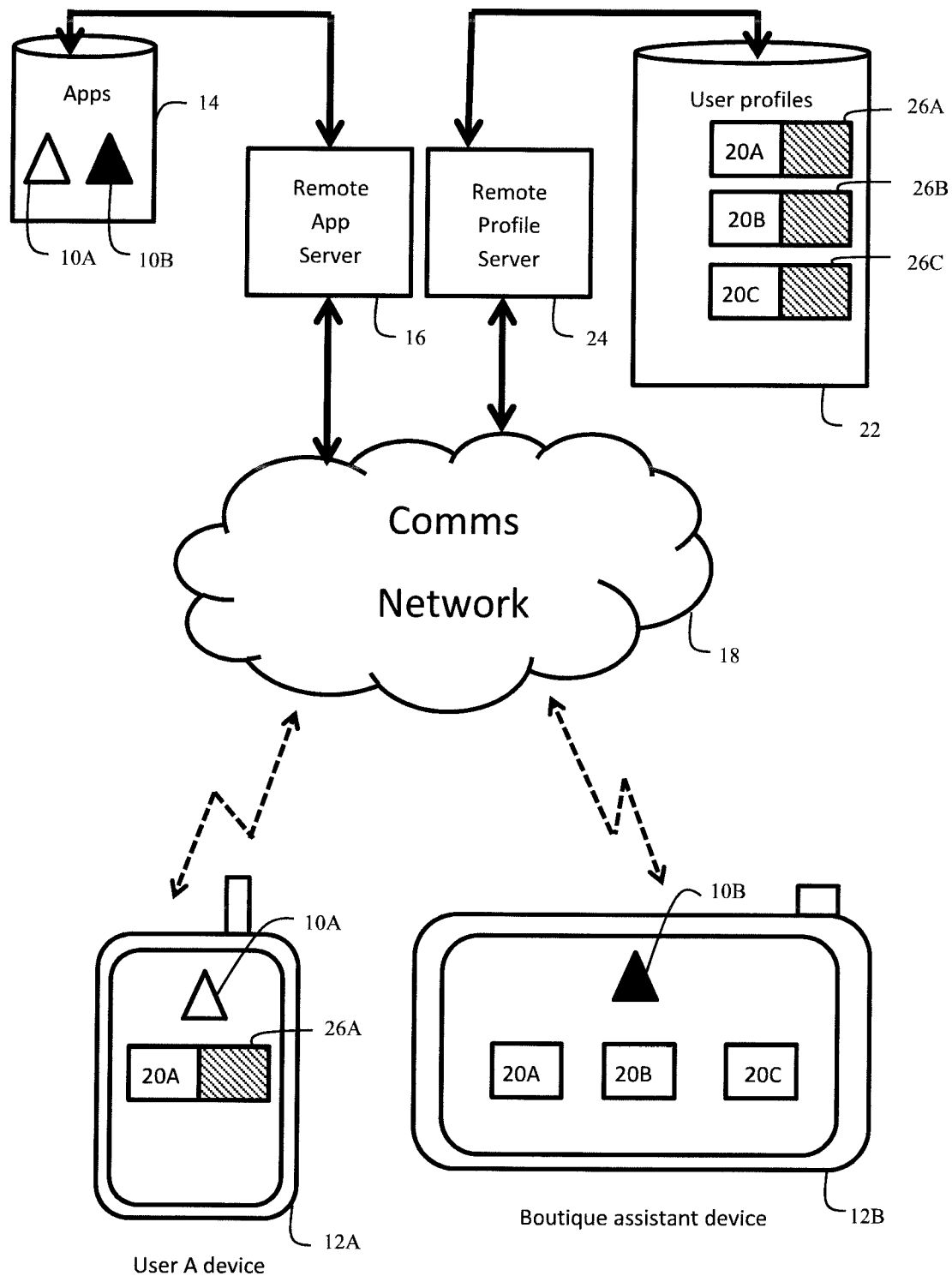
FIG. 1 is a schematic diagram, showing an example of how a software application ("app") according to an embodiment of the present invention may be obtained and information accessed by multiple users on their mobile telecommunications devices.

FIG. 1 firstly illustrates the process through which the SFP application 10A, 10B may be obtained and installed on a suitable mobile telecommunication device 12A, 12B. The application may be stored in a remote external database 14 and accessed via a remote app server 16 by known methods of wireless communication 18. For example, the app 12A, 12B may be available to be downloaded from a website or an app store such as Google Play.

Additionally illustrated is that the application may be downloaded by different classes of user, namely a customer of the store ("User A") and an employee of the store (referred to as a 'boutique assistant') and the application 12A, 12B is illustrated as being different for the two classes of user. This is because the two classes of user may require differing functionalities as a result of their assigned class. The different classes of user may further distinguish subclasses of user, where functionalities of the application are altered with dependence on the subclass of user. By way of non-limiting example, this may comprise discriminating between levels of seniority of a boutique assistant, with some restricted functionalities of the application only afforded to a boutique assistant who has sufficient seniority to access the functionality (such as enabling access to a second user's online preferences, in accordance with embodiments described below).

In some embodiments, the different classes of user referred to above may be required to download different applications which are interrelated (not shown). For example, the customer of the store may be required to download one software application which enables a first set of functionalities, whereas the boutique assistant may be required to download a second software application which enables a second set of functionalities. Some of the functionalities may be common to both the first and second sets of functionalities.

Once installed on the mobile telecommunications device, the SFP application may allow for access to personal data, illustrated in FIG. 1 as user profiles 20A, 20B, 20C. As with the application itself, the user profiles may be stored in a remote database 22 and accessed via a remote profile server 24 by known methods of wireless communication 18. A user profile 20A, 20B, 20C may comprise information which has been compiled through interaction with the SFP application 10A, 10B, online shopping behaviours and preferences associated with the user and physical shopping behaviours and preferences associated with the user. The compilation of information for use in the user profile 20A, 20B, 20C may be achieved implicitly and/or explicitly through user interaction. For example, a user may explicitly select a preference for a particular type of item, or their preference for a particular type of item may be inferred by their repeated viewing or selection of that item type. For the purposes of this description a user profile 20A, 20B, 20C may relate only to a customer and not to the boutique assistant (although a boutique assistant may also additionally be a customer in a different scenario). For the remainder of this description, the customer will be referred to as the 'user.'

The variations of the SFP application 10A, 10B provided to the user and the boutique assistant may be configured to allow differing access to user profiles 20A, 20B, 20C as appropriate. FIG. 1 illustrates graphically that the SFP application 10A, 10B is configured to allow a user with the user variant of the application 10A, full access to their own user profile (20A) with no access to other user profiles (20B and 20C). It further illustrates that a user with the boutique assistant variant of the application 10B may be allowed access to multiple user profiles (20A, 20B and 20C), but restricted from access to portions of each of these profiles 26A, 26B, 26C. The information may be restricted so that the boutique assistant has access to relevant information about the user (such as items they are interested in purchasing), whilst hiding potentially sensitive information (such as payment details). The amount of information which the boutique assistant is allowed to view may be determined by the user in advance of entering the store.

In some embodiments, there may be a plurality of boutique assistants, each with the boutique variant of the SFP application 10B installed on their associated mobile telecommunications device 12B. In these embodiments, each boutique assistant may be provided with access to the multiple user profiles 20A, 20B, 20C in accordance with embodiments described previously. Alternatively, only a subset of the boutique assistants may be provided with this access. The subset of boutique assistants may be selected on the basis of their availability to aid the user. For example, if the assistant is presently aiding a first user, they may be provided with an option within the SFP application 10B to indicate that they are unavailable and so when a second user provides permission to access their user profile, the boutique assistant will not be provided with the second user's user profile. In some further embodiments, the subset of boutique users provided with access may be determined based on information contained within the profile of the user. By way of example, if the user profile 20A, 20B, 20C indicates that the user has a preference for a particular type of item, the profile may be provided to boutique assistants who have indicated that they are suitable to aid a user who has a preference for that item. This indication may occur via interaction with the boutique assistant variant of the SFP application 10B.

In further embodiments, the SFP application 10A, 10B may also allow users to exchange messages between the application 10A, 10B installed on their mobile communications device 12A, 12B, and the SFP application 10A, 10B installed on the mobile communications device 12A, 12B of another user. This may be achieved through suitable exchange of data over an external wireless communications network 18.

Store Apparatus

Figure 2:
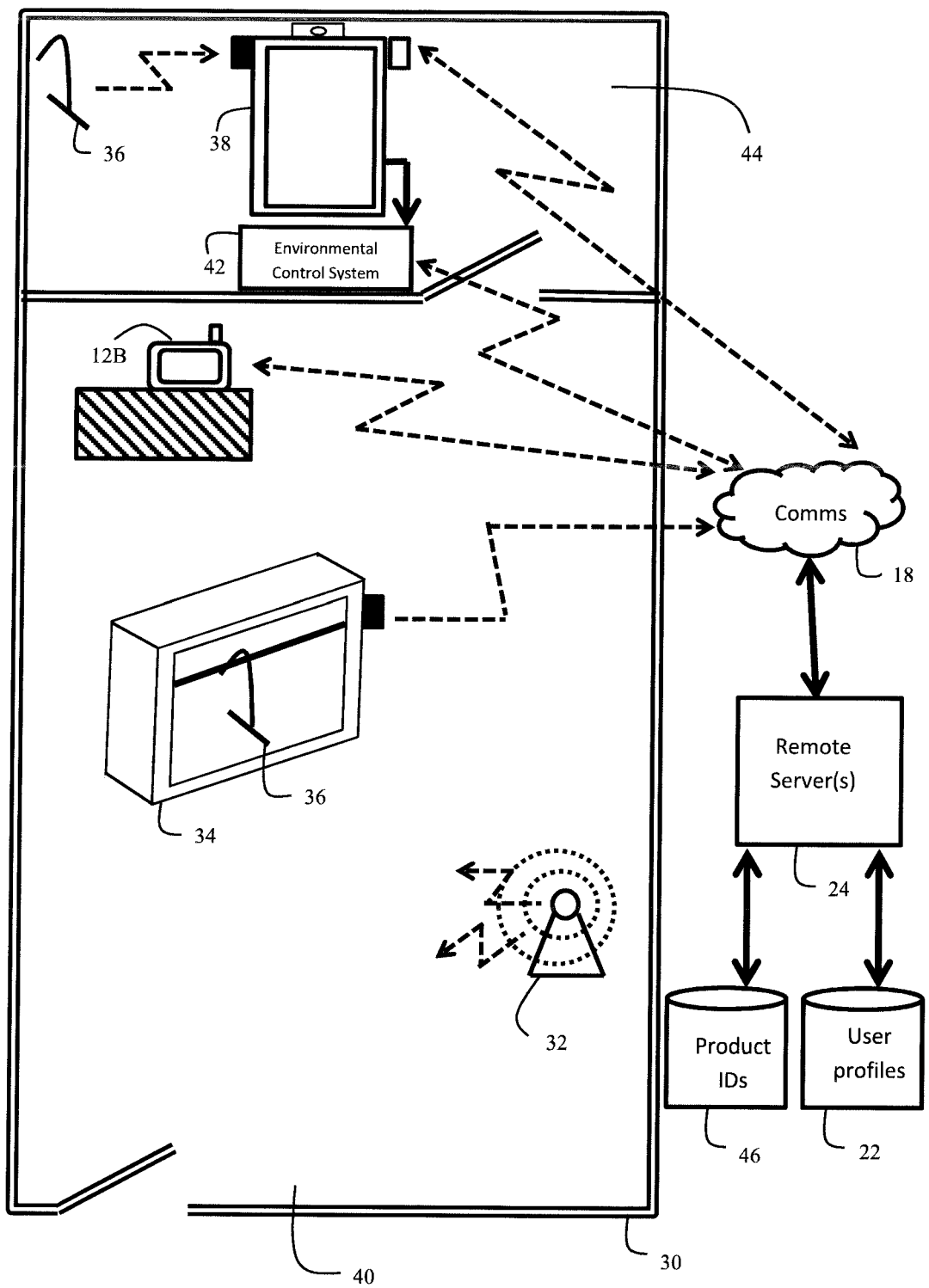
FIG. 2 is a schematic diagram, showing an example of a physical store according to an embodiment of the present invention arranged to provide connectivity between a user's online presence data and their physical store interactions.

FIG. 2 illustrates hardware elements which may be arranged in the physical store 30 in order to enable connectivity between a user profile and a physical store environment. The features shown are:

One or more beacons 32 used to transmit data packets in the form of push notifications to a user's mobile device 12A to alert them of the possibility of using the SFP application 12A, 12B. The beacon 32 may be arranged so that the notification is only displayed on a user's mobile device 12A if their device has the SFP application 10A installed on it. The beacon 32 may be arranged to transmit these messages using a Bluetooth Low Energy (LE) signal, or any other suitable method of wireless communication. The beacons 32 may additionally be configured to wirelessly broadcast an indication of their position relative to a device which receives the broadcast. Whilst not shown, the beacons also communicate with a local position engine which can determine the position of the user's mobile device 12A at any moment in time. Whilst a beacon 32 has been described, it is to be appreciated that any suitable device or devices and methods which enable a user to be notified of the possibility of using the SFP application 10A and to subsequently approve of this usage may be implemented without loss of functionality. This may, by way of non-limiting example, comprise providing a Quick Response (QR) code or check-in device in the physical store 30 which is configured to be interactive and, upon interaction, enables functionality of the SFP application 10A.

One or more interactive garment display units (GDUs) 34 and a plurality of associated items 36 paired with it which are arranged to be removably attached to the garment display unit 34, represented by a clothes hangar icon. Each item and the garment display unit 34 it is paired with may be arranged so that the garment display unit 34 is able to detect when an item has been removed and/or when it has been replaced. The garment display unit 34 may additionally be configured to wirelessly receive and/or transmit data regarding items which have been removed and/or replaced to an external communications system 18. The external communications system 18 includes in most embodiments an item position system which logs the current location of each item in the retail environment. In this way the location of each item can be know at any time. The above mentioned local position engine can also be operatively coupled to the item position engine to provide a real time guidance to a user of a desired item. This is described in detail later. The interactive garment display unit 34 is also discussed in greater detail below, with reference to FIGS. 4 and 5.

One or more interactive mirror devices 38 with a touch screen interface, which may be arranged to receive signals allowing it to detect when an item of clothing or other item 36 has been brought into its proximity from the main shop floor 40. This may be an item which was previously attached to a garment display unit 34, as described above. Additionally, as with the garment display unit 34, the mirror 38 may also be configured to wirelessly receive and/or transmit data to an external communications system 18. This data may relate to items 36 brought into proximity of the mirror 38, user specific information, or information pertaining to a user's interactions with the touch screen interface. Furthermore, the mirror 38 may also be arranged to instruct an environment control system 42 which manages the environmental conditions of a changing room 44 (cubicle) in which the mirror 38 is located. The interactive mirror 38 is discussed in greater detail below, with reference to FIGS. 7, 8 and 9. The interactive mirror devices may also be provided with one or more devices which enable the mirror to identify a user. These devices may comprise a Quick Response (QR) code or check-in device which is configured to be interactive and, upon interaction, enables identification of a user.

One or more boutique assistant mobile telecommunications devices 12B with the SFP application 10B installed on them. As with the interactive garment display unit 34 and the mirror 38, the telecommunications device 12B may be configured to wirelessly receive and/or transmit data to an external communications system 18, where this data may comprise any information relating to a user's interactions with elements of the physical store, or their user profile 20A, 20B, 20C. The location of these assistant devices can also be tracked by the beacons and the local position engine (described above) and can be used to provide additional data to users regarding the real-time location of assistants.

An external communications system 18 which is arranged to wirelessly receive and transmit data to and from the garment display unit 34, mirror 38 and telecommunications devices with the SFP application 10A, 10B installed on them (such as the user 12A or boutique assistant's device 12B). The communications system 18 may also be configured to retrieve data from a remote profile server 24 relating to a user's profile 20A, 20B, 20C, and also to retrieve product identification information from a database 46. Furthermore, the external communications system 18 can also provide the abovementioned item position engine (not shown) and the local position engine (not shown) and these system can be lined into the local inventory system 280A shown in FIG. 16 and described later.

Connection Between User Device and Store

Figure 3:
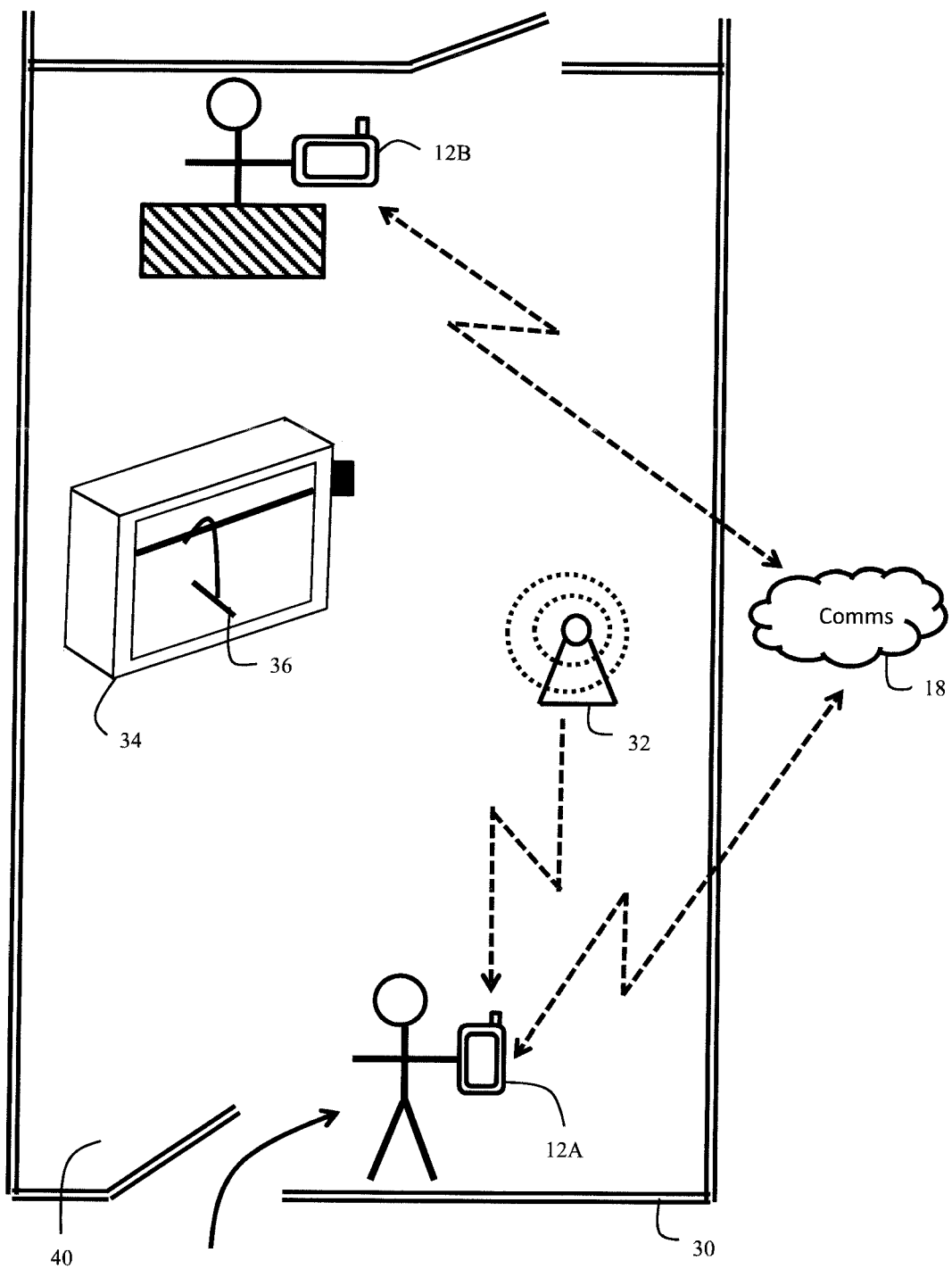
FIG. 3 is a schematic diagram, showing an example of a process which may occur when a customer with the software application of FIG. 1 installed and running on their mobile device enters the store of FIG. 2.

The first instance of a user's profile 20A, 20B, 20C being connected to the physical environment occurs when the user's mobile telecommunications device 12A enters the transmission range of the beacon 32 of FIG. 2. The process which subsequently occurs is illustrated in FIG. 3. For the remainder of this description, it will be assumed that all mobile telecommunications devices 12A, 12B which are referred to will have the SFP application 10A, 10B installed on them and have access to its associated functionality.

Upon a user's mobile telecommunications device 12A entering the transmission range of the beacon 32, which is constantly broadcasting data packets, this device 12A may receive a data packet in the form of a push notification. This notification may be configured to inform the user that they have entered an area where they can use the SFP application 10A, 10B functionality to obtain a more personalised experience. The notification may additionally be configured to request the permission of the user for the application 10A, 10B to access and share required information from their user profile 20A, 20B, 20C via the SFP application 10A, 10B so that such functionality may be performed. If the user opts not to give their permission at this stage then any personalisation functionality associated with this permission will not be available for the duration of their visit to the store. Optionally, the application 10A, 10B may be configured to allow a user to give their permission to use their user profile 20A, 20B, 20C information at any later stage whilst they are in transmission range of the beacon 32. Additionally, the embodiments described herein are directed toward an 'opt-in' system, where the user must give permission for their information to be accessed. It is to be appreciated however that the system may be adapted such it operates using an 'opt-out' methodology, wherein permission is assumed and a user must actively rescind such permission if they do not wish for their profile information to be accessed.

If a user gives permission for their user profile 20A, 20B, 20C information to be used, then the associated functionality will be activated. This may be achieved by the user information being provided both to the user device 12A and also to the boutique assistant device 12B via wireless communication with an external communication system 18 configured to access the user's profile 20A, 20B, 20C. The information which is provided to the user device 12A and the boutique device 12B may be different, in accordance with the description provided above in the software application section, which is illustrated in FIG. 2.

In alternate embodiments, the physical environment 30 may be provided with one or more systems which enable a user to actively give permission for their user profile 20A, 20B, 20C information to be used in association with the SFP application 10A, 10B without the user's mobile telecommunication device 12A being notified that they have entered an area where they can use the SFP application 10A, 10B. This may be achieved, for example, by the provision of a clearly marked QR code which is placed in a prominent position in the physical environment, where the QR code is configured to enable the functionality of the SFP application 10A, 10B described above when it is scanned (image captured) by a mobile telecommunications device 12A. When a user enters the physical environment 30, they may be directed toward the QR code and informed that scanning the QR code with their mobile telecommunications device 12A will enable the SFP functionality. The user may then decide whether to scan the QR code or not, with the choice of scanning it being understood to mean that the user has given permission for their user profile 20A, 20B, 20C information to be used.

In yet further embodiments, the physical environment 30 may be provided with suitable interaction devices which are configured to enable the functionalities described above without requiring direct interaction between the interaction device and the mobile telecommunications device 12A. These may include, but are not limited to, biometric scanning devices (such as fingerprint or facial scanners), and devices which enable a user to input a password linked to their user profile 20A, 20B, 20C. In such an embodiment, each user profile 20A, 20B, 20C may be associated with relevant biometric or other user data. Upon a user entering a physical environment 30, they may be directed toward the interaction device and additionally informed that interaction with the scanner (such as placing a finger on a fingerprint reader) will enable the SFP functionality. Since no interaction between the mobile telecommunications device 12A and the interaction device is required to enable the functionality on the device, the mobile telecommunications device 12A and the SFP application 10A, 10B may be configured to receive data indicating that permission has been given to use the user's profile information 20A, 20B, 20C. This may be achieved by transmitting data indicating that the user has given permission to use their profile information from the interaction device to the mobile telecommunications device 12A via wireless communication with an external communication system 18 configured to transmit such data. Further embodiments may provide a 'dock' device which the user physically connects their mobile telecommunications device 12A to a system in order to enable the device 12A to be connected to a suitably configured system in the store 30. In this embodiment, once the user connects their mobile telecommunications device 12A to the dock, this is interpreted as the user giving permission for their profile information 20A, 20B, 20C to be used, in accordance with embodiments described above. This physical connection then instructs functionalities of the SFP application 10A, 10B to be enabled, as described above. In this embodiment, the activation of the SFP application 10A, 10B functionality is enabled by wired communication. Whilst this embodiment has been described in reference to a dock, it is to be appreciated that this is for illustrative purposes only and that any suitable device may be used which enables the function described above to be carried out.

Interactive Garment Display Unit Functionality

Figure 4:
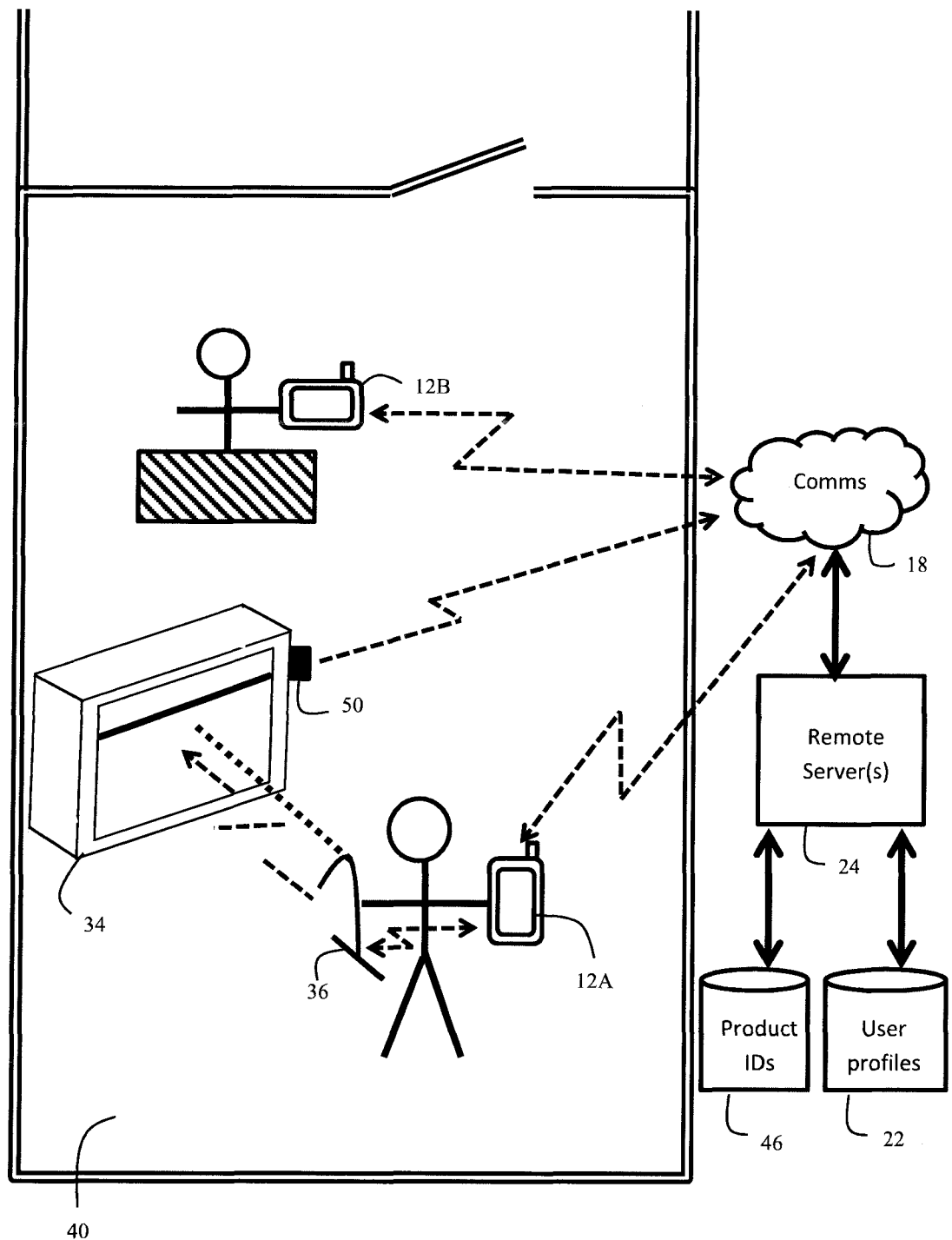
FIG. 4 is a schematic diagram, showing an example of a process which may occur when a customer with the software application of FIG. 1 installed and running on their mobile device removes an item from an interactive garment display unit in the store of FIG. 2.

A further aspect of the present embodiments is directed toward the interactive garment display unit system 34 and its functionality in combination with other elements of the embodiments. An example of such functionality is illustrated in FIG. 4. It is to be understood that the form of the interactive garment display unit 34 displayed in FIGS. 2-5 is for illustrative purposes only, and may take any form which enables the functionality described herein to be achieved. This may include, for example, one or more shelving units, mannequins or clothing racks.

Figure 5:
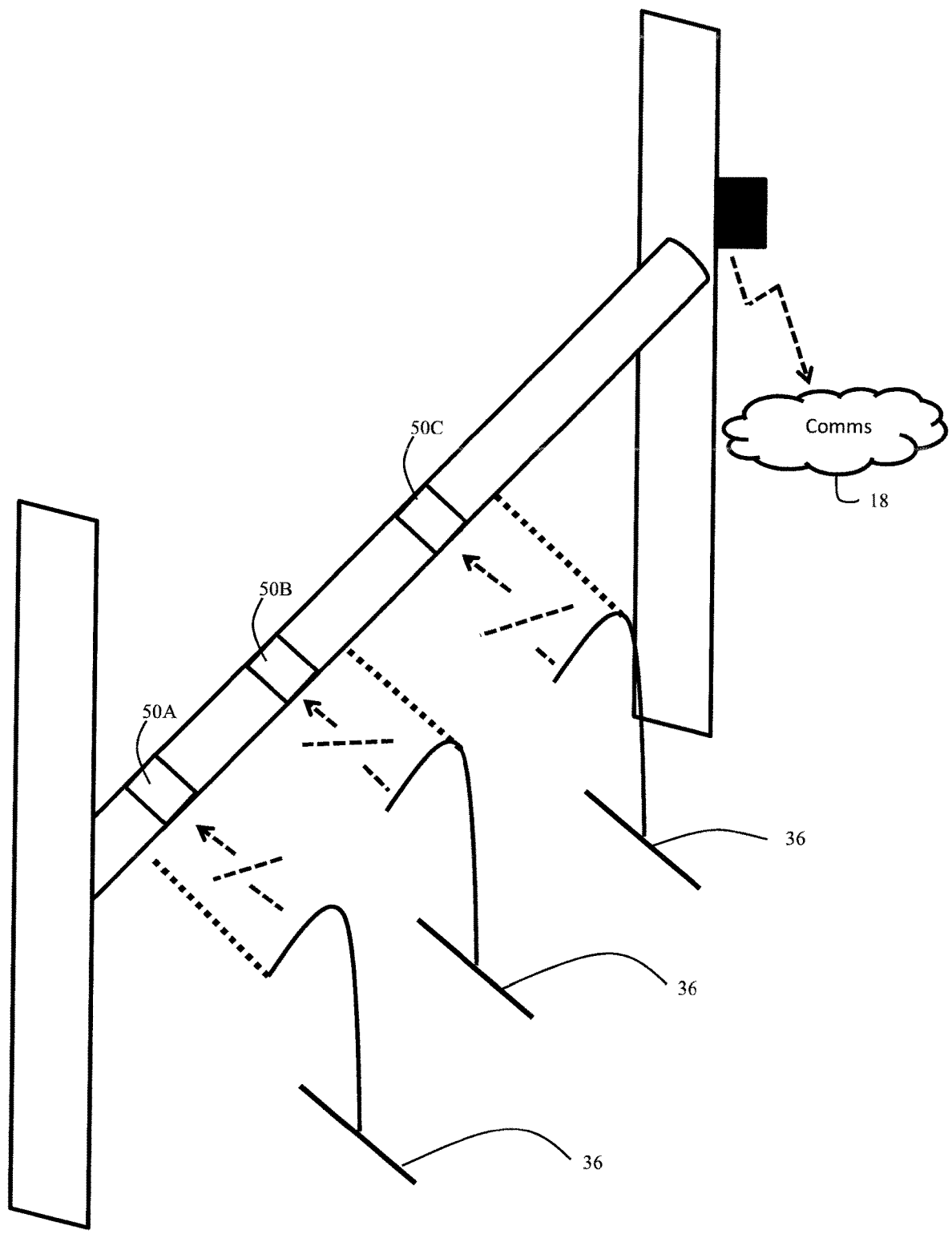
FIG. 5 is a schematic diagram, showing a more detailed example of how the interactive garment display unit of FIG. 4 may be arranged in one embodiment.

The interactive garment display unit 34 may be arranged to be paired with a plurality of items 36 that are removably coupled to it, and further arranged to detect when these items are removed from the garment display unit 34 and/or replaced on the garment display unit 34. This pairing may be achieved by the use of one or more proximity sensor systems 50A, 50B, 50C disposed on the garment display unit 34 system and/or the paired items. In one embodiment of the system, this may be achieved by the use of pressure sensors on the garment display unit 34 which are able to detect when an item 36 has been removed and/or replaced. The system may also be provided with optical sensors which are configured to determine when an item 36 has been removed and/or replaced as a result of the change in the amount of light incident on the optical sensor. In an alternate embodiment of the system, the garment display unit 34 may be provided with a Radio Frequency Identification (RFID) scanner, and the paired items 36 may each be provided with an RFID tag, with the tags configured to provide a signal containing information about that item 36. Such information may include the item type, the item colour and the item size. Upon the item's removal from the garment display unit 34, the scanner of the garment display unit 34 may be configured to detect this removal and associate it with a particular item 36, determined by the information provided by the RFID tag. The detection may be through the garment display unit 34 being no longer receiving the RF signal, or by it detecting that the signal has originated from a location other than directly on the garment display unit 34. The garment display unit 34 may similarly be configured to detect that a paired item 36 has been placed on the garment display unit 34. FIG. 5 shows an example of the garment display unit system 34 where each item 36 is paired with a single sensor 50A, 50B, 50C on the garment display unit 34, with each sensor 50A, 50B, 50C being configured to detect the removal of that specific item 36 from the garment display unit 34. It is to be appreciated that there are many different ways in which this proximity sensing can be realised.

In an embodiment, when an item 36 is removed from the garment display unit 34, the system may additionally be able to determine the identity of the user who has removed the item 36 if the user has enabled the SFP application 10A, 10B functionality. This may be achieved by a wireless signal, such as an RF signal, which includes the item's unique identifier, being sent from the item 36 to the user's mobile device 12A and, upon determining a proximity between the two, associating the item 36 with that user.

When an item 36 is removed from the garment display unit 34, the garment display unit 34 may also be configured to wirelessly transmit data relating to a product identifier of the removed item to an external communications network 18. This may be achieved by use of any suitable wireless communication method. The communications network 18 may then be configured to further communicate this information to the mobile telecommunications devices of the user 12A and the boutique assistant 12B to provide them with information about the item 36 that has been removed. The garment display unit 34 may be similarly configured to transmit data when an item has been placed on the garment display unit 34. In some embodiments, the garment display unit 34 may be configured to transmit data relating to a product identifier of the removed item 16 to a local communications network via a wired communication (not shown). This may be achieved through transmission of a signal along a suitable communication cable from the garment display unit 34 to the local communications network. The local communications network may then be configured to provide this information to the mobile telecommunications device 12A of the user, in accordance with the description above.

The communications network 18 may additionally be configured to receive information regarding the identity of the user. This configuration may be used when the identity of the user has been established using the method described above. The receipt of information may be achieved either through wireless communication via the garment display unit 34 or via the mobile telecommunications device 12A of the identified user. As above, this information may then be further provided to the boutique assistant via their mobile telecommunications device 12B.

In addition to retrieving information about an item 16 which has been removed from the garment display unit 34, the communications network 18 may also be configured to retrieve information regarded items 16 which are identified as being similar to the removed item. Related items or associated items may be determined as being related to the first item through predefined associations which are able to be retrieved from a database 46 by the communications network 18. The communications network 18 may then be configured subsequently to transmit data relating to these associated items to the mobile telecommunications devices of the user 12A and the boutique assistant 12B.

User Location

In a yet further aspect of the embodiments, the location of related items as defined above may be indicated to the user via interaction with the SFP application 10A. This location information can provide the user with an indication of where these items may be found in the store 30 in relation to themselves. This may be achieved by the use of a local positioning system in combination with a display of the floorplan of the store 30 which may be available on the application as described in the software application section above. Alternatively or in combination floorplans can be downloaded with software updates or on demand once the location of the user's mobile device near a store is determined.

The floorplan of the store 30 described above can be configured to include information about a plurality of points of interest present in the store 30. These points of interest may include the location of changing rooms, bathrooms, payment points, boutique assistant help stations and the location of particular areas of the store 30 dedicated to a specific category of items (for example coats or shoes).

In this aspect, when an item 36 is removed from the garment display unit 34, information relating to that item 36 and related items may be transmitted to the user's mobile telecommunications device 12A using the method described in the interactive garment display unit 34 functionality section above. Upon receipt of this information, the SFP application 10A may be configured to display on the user's mobile device 12A both the user's location on a floorplan of the store 30 displayed in the application 10A and the location of the identified related items. The location of the items may be fixed and known to the SFP app 10A, 10B, and automatically displayed as part of the floorplan display. The location of the items may also be variable. In this case when the locations of the items change, the SFP application 10A, 10B may be configured to receive information (for example, from interactive garment display units 34) regarding their updated location and alter their locations within the floorplan display accordingly. It may also be possible that the identified related items are not present in the same store 30 as the user. In this instance, the SFP application 10A may be configured to notify the user that the similar item is not present in the store 30.

Figure 6:
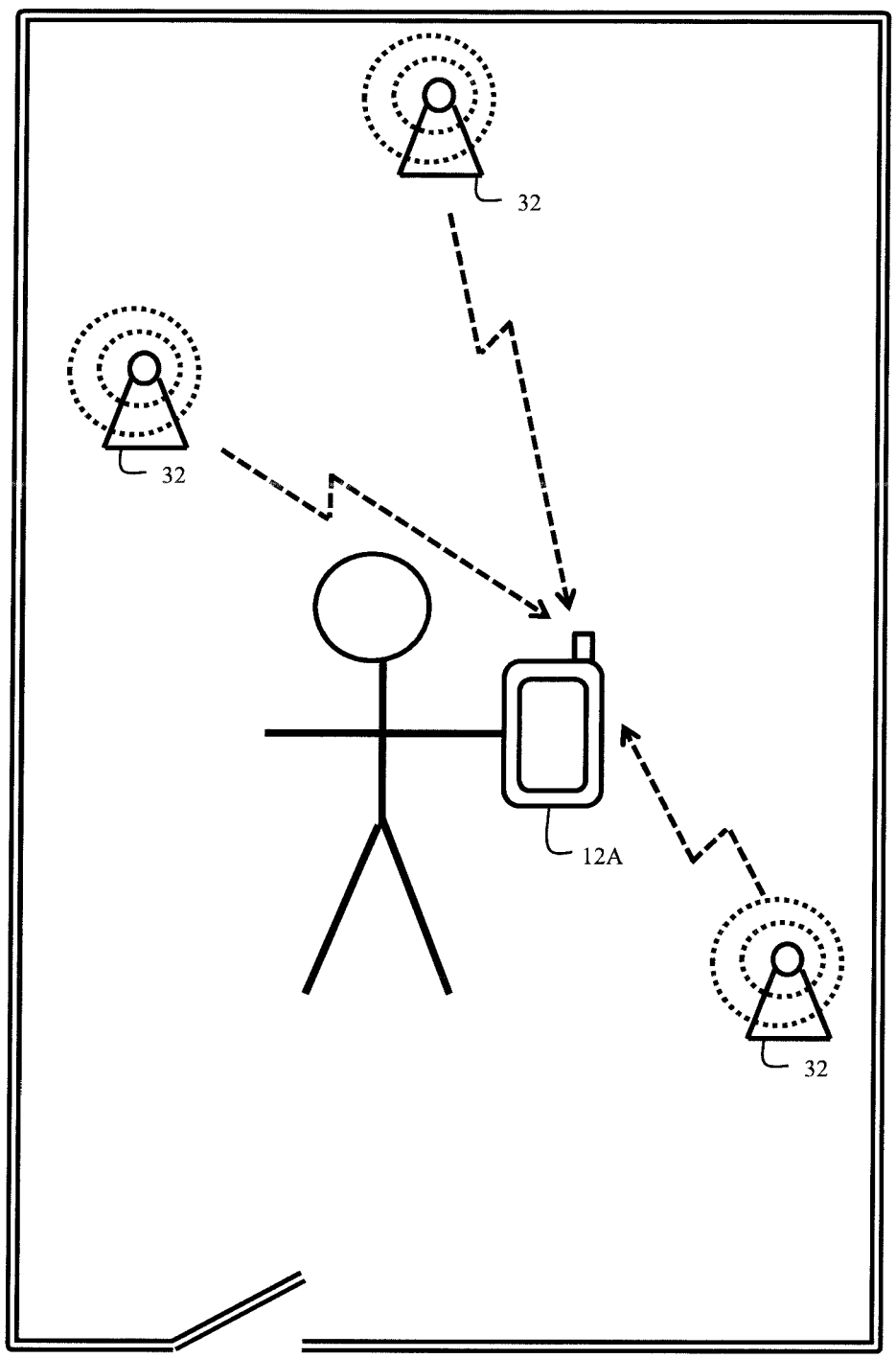
FIG. 6 is a schematic diagram, showing an illustration of beacons being used as part of a high-resolution local-positioning system.

The user's location may be determined by the use of the local positioning system discussed above, an example of which is illustrated in FIG. 6. The local positioning system functionality may be achieved by the use of a plurality of beacons 32 arranged within the store. The beacons 32 to be used may be the same as those used to transmit data packets as described in the store apparatus section. In this aspect of the embodiments, the beacons 32 may each be configured to transmit a wireless signal to the user's mobile telecommunications device 12A. The user's mobile device 12A may then be configured to receive each of these signals in order to determine the distance from each of the beacons 32, whose location may be known to the mobile device 12A. These measurements may be combined with each other and, by the use of an appropriate trilateration or multilateration technique, used to generate a user's location on the displayed floorplan. For example each beacon 32 can transmit a timestamp and high-resolution location data. The mobile device 12A can, on receipt of each transmission, also add a timestamp and then determine the distance from the beacon 32 as a result. Using three beacons 32 gives a very accurate position of the device 12A in the store relative to the beacons 32. In this regard, the resolution achievable by use of the local positioning system enables accuracy to 30 cm whereas GPS would have a resolution to ten metres. In FIG. 6 three beacons 32 are shown, however in different embodiments a greater number of beacons 32 may be used. Increasing the number of beacons 32 may additionally increase the accuracy of the location measurement. In order to accommodate an additional number of beacons 32, the method used by the mobile device 12A to determine its own position may need to be modified so as to include the increased number of distance measurements.

The application may also display a route for the user to a location in the store 30 where the related items are provided. If the user decides that they wish to retrieve these related items, they may then use the application 12A as a guide, with the local positioning system updating the user position in real time on the floorplan as they move to the indicated location.

The above method for displaying a user's location on a floorplan display may also be used when no related items are identified on the display. In this case, the elements which would be displayed to the user would be the user's location, the floorplan, and any notable points of interest as described above, for example changing rooms, point of sale desk etc. In this way, the user may be able to use this aspect of the embodiments as a method of navigating themselves to the established notable points of interest. The method described above for locating a user's device may be equally applied to locate a boutique assistant mobile telecommunications device 12B (i.e. by use of multiple beacon 32 transmissions and timestamps, the boutique assistant device may be able to determine its location in the store 30). The location information of the boutique assistant device 12B may then be transmitted to a user's mobile device 12A wirelessly via an external communications network 18. The user's mobile device 12A may then be configured to receive this information and subsequently show the location of the boutique assistant device 12B on the floorplan display. As with the location of the user, the location of the boutique assistant device 12B may also be updated in real time. This information would allow a user to quickly locate a boutique assistant in the case where they require aid from the assistant. Also further information regarding the boutique assistant may also be provided and displayed such as experience, skills and current status.

The boutique assistant device 12B may also be configured to perform any of the relevant location and map functionalities described above. In addition, the location of any users in the store may be provided to the SFP application 10B installed on the boutique assistant device 12B, where the location of the user may be determined using the above method. The provision of this information may for example be achieved by including the user's location in the store as part of the user profile 20A, 20B, 20C which the boutique assistant device 12B is configured to receive. In this case, the user's mobile device 12A may be configured to update the relevant user profile 20A, 20B, 20C frequently and wirelessly through an external communications network 18. This information may then be subsequently transmitted to a boutique assistant device 12B in accordance with the communications arrangement of FIG. 1. The user location may then be displayed on a floorplan display in the application 10B provided on the boutique assistant device 12B.

Figure 6A:
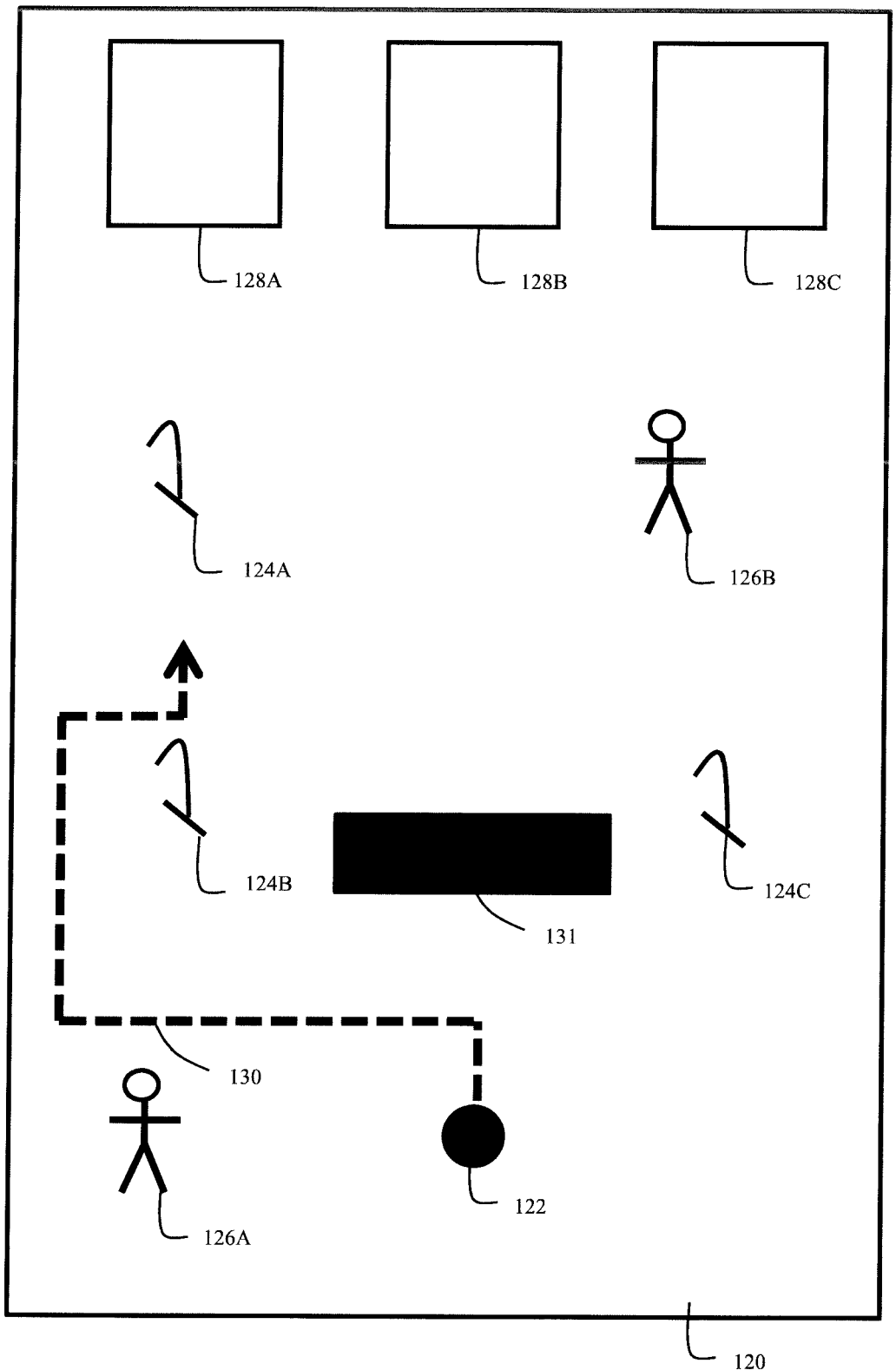
FIG. 6A is a schematic diagram, showing an example of a floorplan display which may be displayed on the screen of a mobile telecommunications device in an embodiment by the software application of FIG. 1.

Referring to FIG. 6A, there is shown an example of a floorplan display 120 which may be displayed on a user's mobile telecommunications device 12A in accordance with embodiments described above. This may be used in conjunction with the local positioning system discussed above. In this example, we see a plurality of features which may be displayed in order to assist the user in determining the position of a particular feature in relation to their own current position. There is firstly shown a symbol to denote the present location of the user 122. There are also shown a plurality of icons 124A, 124B, 124C indicating the position of particular items in the store. These items may relate to all items available in the store. Alternatively, the items displayed may be restricted to items identified by the user as being of interest. For example, this may be either in the form of related items as described above, or items which are on the user's wish list. The wish list functionality is described below. There is also shown a plurality of icons 126A, 126B indicating the position of boutique assistants in the store. There is also shown a plurality of icons 128A, 128B, 128C indicating the position of changing rooms within the store, in the event that the user of the application 10A wishes to try on an item or accessory which they have selected.

FIG. 6A also shows a route (pathway) 130 between the user symbol 122 and a particular item symbol 124A, in accordance with embodiments described above. The route 130 which is shown is between the user symbol 122 and one item symbol 124A but it is to be appreciated that the route 130 displayed may be between the user symbol 122 and any of the symbols displayed on the floorplan display 120. The route 130 to be displayed also takes into account obstructions 131 which may prevent the user from reaching the denoted item symbol 124A and directs the user around them.

In some embodiments, the determination of which symbol the route 130 connects the user symbol 122 to may be selected by the user by interaction with the SFP application 10A. This selection may be enabled, for example, by selecting the item on a touch screen interface on the user's mobile telecommunications device 12A. Alternatively, the determination of which symbol the route 130 connects the user symbol 122 to may be automatic, in dependence upon items that the user has indicated is of interest to them, or items related to items they have selected from a garment display unit 34. It is also to be appreciated that whilst one route 130 is shown in FIG. 6A, in other embodiments, multiple routes 130 to different symbols may be displayed simultaneously.

In some embodiments, the user may choose to opt-in and/or opt-out of one or more of the described user location functionalities through suitable interaction with the SFP application 10A. Once this is indicated, the SFP may store this choice within the user profile 20A, 20B, 20C as a preference until such a time as this preference is altered.

In-Store Wish List

When items 36 are removed from the garment display unit 34 in accordance with the method described above (even if they are subsequently returned), the user interaction triggers information relating to those items 36 to be displayed on the mobile device 12A. This takes the form of an 'in-store wish list' functionality within the SFP application 12A. In this example, photographic representations of the items 36 which have been removed from the garment display unit 34 appear in the SFP application 10A interface. The user is able to interact with these representations to indicate whether or not they like the item 36. They may do this via any appropriate gesture, such as pressing a button display on their device 12A, or 'swiping' in a particular direction, with one direction indicating they like the item 36, and another direction indicating they do not like the item. Information relating to their item preferences may then be associated with their user profile 20A, 20B, 20C to determine a sophisticated user filter which can be used to filter out items which the user is unlikely to be interested in from the vast catalogue of available items. This information may then be available to anyone whom the user has permitted to access it, which may include boutique assistants, friends and marketing collection databases, as well as themselves at a later date. The transmission of this information may occur through the use of any suitable wireless connection method. The in-store wish list and noting of user item preferences may either be conducted immediately (i.e. when the user initially selects the item), or may be stored on the SFP application 12A to be decided at a later point.

Any information which has been collected regarding a user's item preferences (namely the user filter) may additionally be used to suggest related items which the user may be interested in through use of predefined associations which may be accessed by the application. Alternatively, the sophisticated user filter can be customised and used to locate associated items by filtering out non-associated items from the complete inventory of available items. The suggested items may also take into account the location of the user and only suggest items which are available in the present store, or other stores which are close by. In doing so, inventory databases of items may be accessed to determine location and stocking information (this is described in greater detail later).

In some embodiments, the in-store wish list may comprise items which have previously been selected on an online interface, prior to the user entering the physical store 30. These items may be included as part of the profile information 20A, 20B, 20C which is accessible through use of the SFP application 10A, 10B which is enabled in accordance with the embodiments described above. The items included on the list may also include items which have previously been interacted with in a physical store 30 on a prior visit to the store 30, where the addition of the items to this list is in accordance with the embodiments described previously. In further embodiments, the list may be configured to include items from a plurality of lists, where each list comprises items which have been selected from a plurality of online interfaces. In such embodiments, the SFP application 10A, 10B may be configured to receive information from the plurality of online interfaces and concatenate each of these items into a single list. Furthermore, the SFP application 10A, 10B may be configured to alter the display of the application 10A, 10B in dependence upon the origin of the item. For example, if a first selected item is determined to have originated from a first list, the display of the SFP application 10A, 10B may be configured to display the item according to a colour scheme associated with the online interface associated with that list. If a second item is then selected which is determined to have originated from a second list associated with a second online interface, the display may then be configured to alter to show a colour scheme associated with the second online interface. The SFP application 10A, 10B may also be configured to display a transition animation between the two colour scheme displays. Whilst the above example describes alterations to a colour scheme in dependence upon the origin of the item, it is to be appreciated that this is purely an illustrative example and that any suitable display alteration may be used. This may include altering the display such that a 'tag' is added to the item which displays the name of the list or associated online interface that an item originated from. The display may additionally or alternatively be configured to display one or more distinctive icons which are associated with the list or online interface that the item originated from.

Interactive Mirror Functionality

Figure 7:
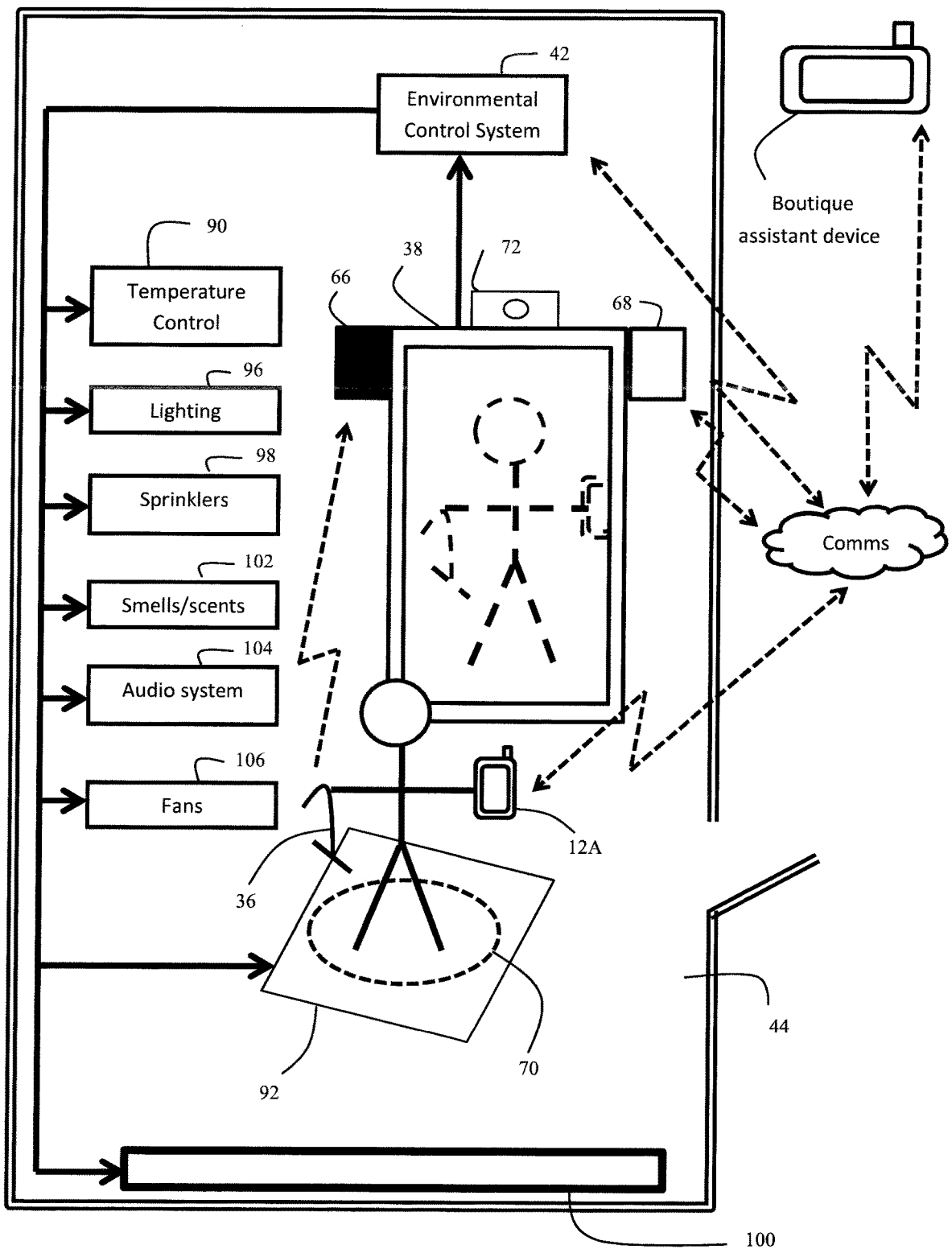
FIG. 7 is a schematic diagram, showing an example of a process which may occur when a customer, with the software application of FIG. 1 running on their mobile device, enters a changing room of FIG. 2 which is provided with an environmental control system, with an item from the interactive garment display unit of FIG. 4.
Figure 8:
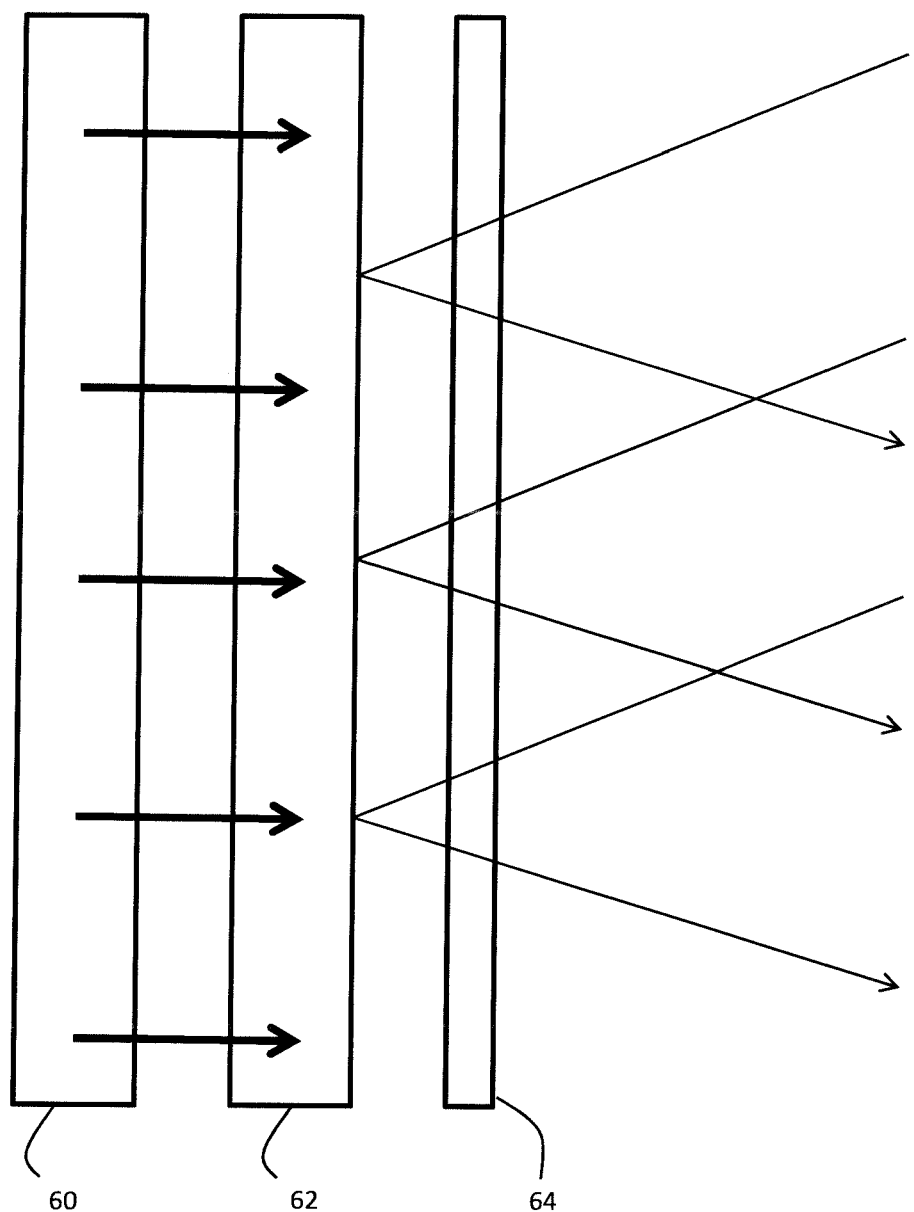
FIG. 8 is a schematic diagram, showing an example sectional view of an interactive mirror device shown in FIG. 7.

A yet further aspect of the embodiments is directed toward the interactive mirror system 38 and its functionality in combination with other elements of the embodiments. An example of such functionality is illustrated in FIG. 7.

The interactive mirror system 38 comprises an interactive mirror and a control/sensor system. The interactive mirror may be constructed with the following elements, which are shown in the sectional display of FIG. 8:

A display screen 60;

A two-way mirror 62 with a transparent internal rear surface and a reflective external front surface, which allows light from the display screen 60 to pass through its rear surface to be displayed on its front surface, and also reflects light from external sources on its external front surface; and A transparent touch interface 64 arranged on the reflective front surface of the two-way mirror 62 which allows for user interaction with elements displayed on the mirror, and also allows light from external sources to pass through it.

Referring again to FIG. 7, the control/sensor system may further be arranged with a proximity sensor 66 for detecting items 36 which have been brought into its vicinity (for example, the changing room 44). In one embodiment of this aspect, the interactive mirror system 38 may be provided with a Radio Frequency Identification (RFID) scanner, and the items 36 it is configured to detect, may each be provided with an RFID tag. In this case, the tags themselves are configured to provide a signal containing information about that item 36. These items 36 and associated tags may be the same items which are described in the interactive garment display unit 34 functionality section. This functionality does not require the installation of the SFP application 10A, 10B on a user's mobile device 12A in order for it to be used.

The control/sensor system may additionally be configured to wirelessly transmit and receive data to/from an external communications network 18 via any suitable wireless communications module 68. The data may comprise information relating to the items 36 in the vicinity of the interactive mirror system 38 and items which have been identified as being similar to those in the vicinity of the interactive mirror system 38. These related items may be determined using the method described in the interactive garment display unit 34 functionality section. As above, this does not require interaction with the SFP application 10A on a user's device 12A.

Using the data described above, the interactive mirror system 38 may be configured to show photographic representations of the items 36 and/or other identified related items on the display screen 60 element of the mirror, which allows a user to see a representation of the item 36 and/or identified related items. Additional details may also be displayed, such as the price of the item 36, the size of the item 36 and whether the item 36 is in stock in this store 30 or other nearby stores.

The touch screen 34 element of the mirror may be configured to allow a user to interact with various elements of the surface of the mirror through known methods, to enable additional functionalities of the mirror. An example of a possible interface is shown in FIG. 9.

The interactive mirror functionalities described above may include sending messages to a boutique assistant device via an external communications network 18 as described above, without the need for the user to have the SFP application 10A installed on their mobile device 12A. These messages may include the ability to call for assistance, or to request that additional items are brought to the person using the interactive mirror. A user may additionally use a touch screen interaction to select items for purchase and subsequently initiate a payment for these items. This payment initiation may be achieved by interacting with the mirror's touch screen 64 interface to enter required details necessary for a purchase (such as payment card numbers, sort codes etc). A message may then be sent to the boutique assistant device 12B (as described above), indicating that payment has been initiated. The boutique assistant may then be required to take an action before the payment may be completed, such as confirming that this transaction is able to take place after a review of current stock levels. This confirmation may be configured to occur via interaction with the SFP application 10B installed on the boutique assistant device 12B. In some embodiments, the payment initiation may be achieved solely through interaction with the SFP application 10A on the user's mobile telecommunications device 12A.

In this aspect of the embodiments, the interactive mirror system 38 may additionally be configured to allow a user to request that any purchased items are to be packed by a boutique assistant at a check out location, to be collected by a user as they leave a store 30. This may be achieved by the interactive mirror system 38 sending a message to the boutique assistant device 12B informing them of this request, using the method described above. This would allow a user to have their items ready for collection without them needing to physically carry them to a check out location to be packed.

Similarly the interactive mirror system 38 may additionally be configured to allow a user to request that any purchased items be packed and delivered to a provided address. The address may be input by the user through suitable interaction with the mirror's touch screen interface 64. The address and request may then be transmitted to the boutique assistant device 12B using the method described above, and subsequently the boutique assistant may attend to the packing and delivery of the purchased items. Alternatively, the interactive mirror system 38 may be configured to transmit this information directly to an external central warehouse location through an external communications network 18. The warehouse location may be provided with an interface for receiving such transmissions via a suitable wireless communications module. The warehouse location may then attend to the delivery and packing of the purchased items. This functionality allows a user to purchase items and have them subsequently have them delivered to their home without the need for them to be carried by the user at all.

The interactive mirror system 38 may additionally be configured to send and receive information to and from any other devices which may be in communication with the external communications network 18, such as a user's mobile telecommunications device 12A. In this aspect of the embodiments, a user may use the SFP application 10A installed on their mobile device 12A in order to interact with various aspects of the interactive mirror system 38.

One example of this functionality is the ability for the interactive mirror system 38 to receive information regarding aspects of a user's profile 20A, 20B, 20C, such as the user's wish list, and displaying the received information on the mirror display screen 64. This would allow a user to view items on their wish list without physically needing to select the item and bring it with them by displaying photographic representations and/or additional details of the items on the display screen 64, as described previously. This may be achieved by the user's location being transmitted to the mirror, and upon detection of the user being in proximity of the mirror, aspects of the user's profile 20A, 20B, 20C are transmitted wirelessly to the mirror via an external communications network 18. The user's location may be determined and described in the user location section above.

A user may additionally initiate and complete a payment for selected items via the SFP application 10A. In this instance, when a user has selected items for purchase using the touch screen interface 64, a notification may be sent to their mobile device 12A from the interactive mirror system 38 via the external communications network 18 indicating that a purchase may be made. The user may then request that such a payment be initiated. This request is then sent from the user's device 12A via the external communications network 18 to the boutique assistant device 12B, notifying them that a purchase is to be made and the user who has initiated the request. The boutique assistant then interacts with their application 12B to confirm details in relation to the purchase, such as the items to be purchased and details of the user who has initiated the purchase. Following confirmation of these details, a further message is sent to the device of the user 12A who will confirm payment details via their version of the application 10A. The ability to request that items be packed without the user having to physically carry them (as described above) may equally be achieved via a user's interaction with their mobile device 12A, with the requests being sent via the external communications network 18. In this aspect, if an item is requested to be sent to the home of the user, the user's address may be part of their user profile 20A, 20B, 20C and automatically identified by the interactive mirror system 38.

In a further aspect of the interactive mirror system 38, an additional area on the floor 70 of the changing room in the vicinity of the mirror may be provided which indicates a location that a user may position themselves in so that additional functionalities of the interactive mirror system 38 may be used. Such functionalities may include automatic sizing of items which a user has brought into the room using known information regarding the location of the user and the item 36 which has been brought in (using the proximity sensor method as described above). These functionalities may be used without the user having the SFP application 10A installed on their mobile device 12A. Alternatively, a user may interact with the application 10A to use this functionality, when the application 10A has been suitably configured. The interactive mirror system 38 may also display items on the display screen element 64 of the mirror to virtually project an item onto a user when they stand in the location 70 described above. This item may be one other than items that the user has brought into the vicinity of the mirror (such as items identified as being similar as described above). A user may further interact with the interactive mirror system 38 to alter the colour or pattern of a displayed item, such that the user can visualise what wearing the same item in a different colour would look like without having to try on the item.

If a user wishes to project an image of a virtual item onto themselves which is not in the changing room 44 with them, it will be preferable to project a correctly sized image. If a user has brought in a first item 36 with them and the information provided to the interactive mirror system 38 about that item includes the size of the item 36, the mirror may use this information to project an image of the virtual item of the same size as the first item.

However, if such sizing information is not available (either because sizing data is not provided, or no physical item has been brought into the vicinity of the mirror), then the mirror may be able to automatically assess the correct size of item to project onto the user. This may be achieved by the use of a body scanner 72 disposed upon the interactive mirror system 38. When a user is located on the area of floor 70 indicated above, the body scanner element 72 of the mirror may detect an outline of the user by using a suitable scanning technique to differentiate between a user and their background. The scanner may be arranged so that only the outline of the user is detected, and no specific detail regarding the user is generated. Using the outline information and the knowledge of where the user is in relation to the mirror, the mirror may use a suitable software algorithm to determine the approximate clothing size of the user. This information may then be used to project a correctly sized image of an item onto the user, as described above.

The body scanner 72 may be configured to achieve its functionality using low radiation scanning methods, such as by the use of radio waves, or low level X-rays. The use of this type of scanning wave allows for repeated use without a significant risk of harm to the user.

In some embodiments, the sizing information which arises as a result of the body scanner may be stored as part of the profile information 20A, 20B, 20C of the user. This may result in future efficiencies as sizing information has now been made available, meaning that a second body scan would not be necessary in future uses of the described system.

The sizing information which is obtained through any of the embodiments described above may be used when suggesting related items, in accordance with embodiments described previously. For example, if an item which may otherwise be deemed to be related to a presently selected item 36 is determined as not being available in the size of the user, the suggestion may be filtered out since it is not suitable for the present user.

In some embodiments, the mirror may further be provided with an image capture device which enables the user to capture one or images of them wearing items of clothing. These images may then be transmitted to the mobile communications 12A device of the user, using a suitable wireless communication method as described above. The interactive mirror system 38 may also be configured to enable a user to specify a recipient for the images which is external to the physical environment 30, such as by providing an email address or telephone number which the image is to be sent to. This may be achieved through a suitable connection to an external wireless communications 18 network as discussed previously. This may enable a user to obtain an opinion from an external party regarding the aesthetic quality of a clothing item, without requiring that the external party be present. The operation of the camera may be enabled through interaction with the SFP application 10A, 10B, where such interaction functionality is discussed above. Furthermore, the operation of the camera may additionally (or alternatively) be enabled by direct interaction with the interactive mirror system 38, such as by interaction with the touch screen of the interactive mirror 64.

Figure 10:
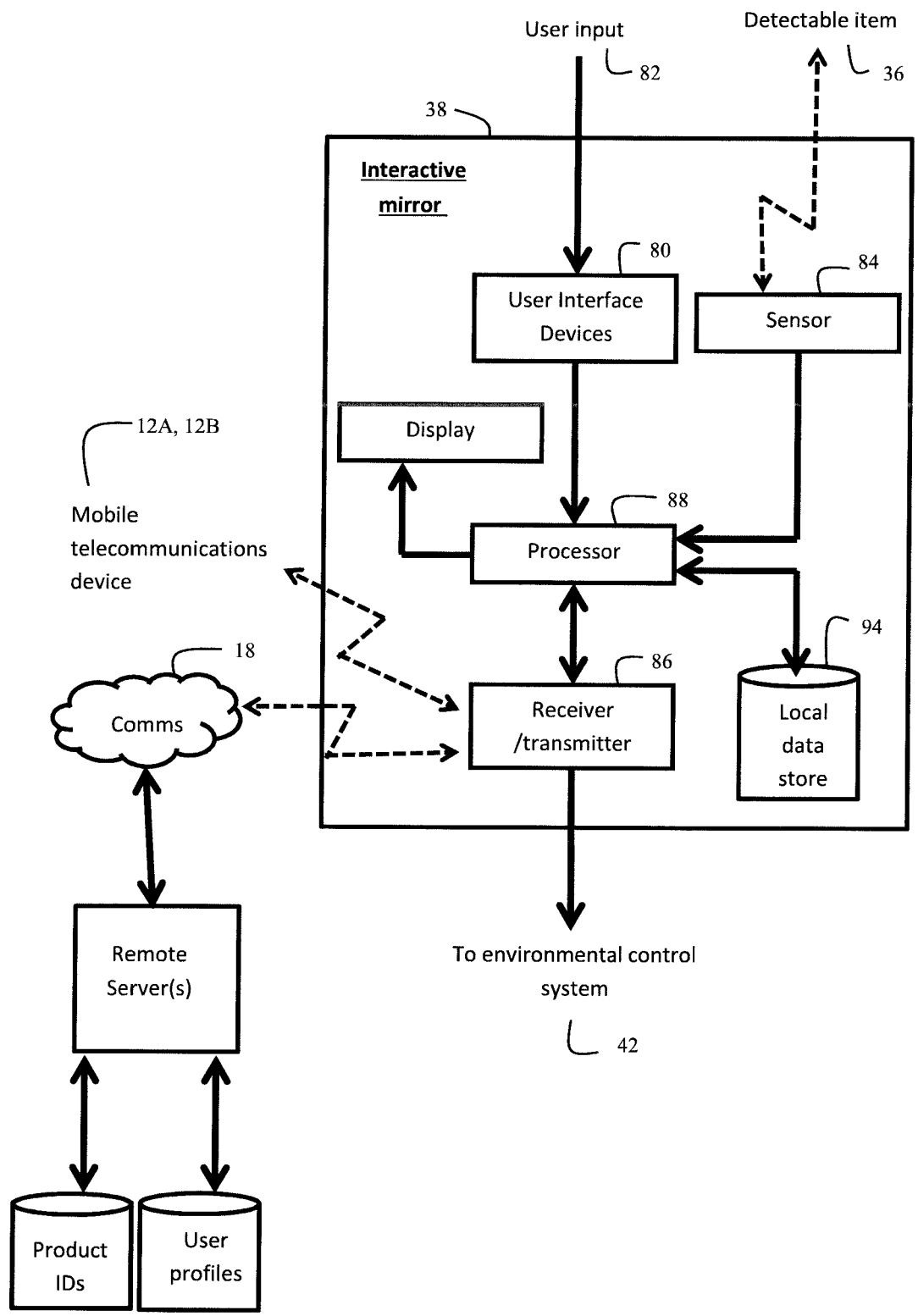
FIG. 10 shows a schematic block diagram, illustrating elements of the interactive mirror device of FIG. 7.

Turning to FIG. 10, there is shown a schematic block diagram of one embodiment of the interactive mirror system 38, which illustrates the elements provided in the interactive mirror system 38 of the embodiment. There is firstly provided a user interface device 80 which is configured to receive input from a user 82. Whilst one device 80 is shown, it is to be appreciated that there may be a plurality of devices provided. This device 80 (or devices), may comprise any apparatus which is suitable to receive a form of user input 82. With reference to the above description, this may comprise a transparent touch interface 64 to receive a touch input from a user. The device 80 may also comprise the body scanner 72 described above, where the input to be received is scanned information relating to the user. The interactive mirror system 38 also provides a sensor 84 (or plurality of sensors) configured to receive information pertaining to an item 36 which is brought into the proximity of the interactive mirror system 38, in accordance with the embodiment described above.

There is also provided a receiver and transmitter 86 which are configured to receive and transmit wireless communication signals. In particular, the receiver and transmitter 86 are configured to receive and transmit data to and/from a mobile telecommunications network and an external communications network 18, in accordance with the embodiments described above. These transmissions may concern retrieval of product IDs 46, user profile 20A, 20B, 20C information and any suitable communication from the SFP application 10A, 10B which enables a user to interact with various aspects of the interactive mirror system 38. It is to be appreciated that the receiver and transmitter 86 may be replaced with a single transceiver without loss of functionality.

The user interface device 80 or devices, the sensor or sensors 84, and the receiver and transmitter 86 are each communicably coupled to a processor 88 which is provided in the interactive mirror system 38. The processor 88 is configured to receive data from each of these elements, namely data relating to user profile 20A, 20B, 20C information, items 36 in the vicinity of the interactive mirror system 38 and any relevant user input. The processor 88 is additionally configured to process this data and determine an action to be taken in dependence upon this data. This action may comprise instructing a display screen 60, which is communicably coupled to the processor, to display an appropriate image. This image may, for example, comprise displaying an image on the screen of the item 36 which is determined to be in proximity of the interactive mirror system 38. The image may further use data received from a body scanner 72 or user profile 20A, 20B, 20C information to adjust the image to match the clothing size of the user, in accordance with descriptions given above.

The action to be determined may also comprise providing instructions to an environmental control system 42 relating to how to alter the environmental conditions of the physical environment 44 surrounding the interactive mirror system 38. The instructions may take into consideration the preferences of the user which may be provided within the received user profile 20A, 20B, 20C information. There may also be 'default' environmental settings for each of the items 36 which are brought into proximity of the interactive mirror system 38 which may be determined during item detection, or may be retrieved via the external communications network 18. The processor 88 may be configured to give priority to user preferences over default settings where a conflict is established. Alternatively, the priority also may be given to default settings.

The instructions may comprise the provision of a simple 'generalised' instruction which provides environmental conditions which are to be reached, for example, bring the room temperature to 30° C. In this scenario, the equipment to be controlled to enable such an environmental condition may not be specified by the instruction, since the controller 42 may be automatically configured to associate a temperature change with, for example, an air conditioning system 90. Alternatively, the instruction may be more prescriptive and additionally specify which piece of environmental apparatus is to be instructed and the specific action that it should take. For example, a moving walkway 92 may be identified in the instruction and specifically instructed to begin rotating at a speed of 5 mph.

Once an action to be taken has been determined, the processor 88 is configured to transmit this message to the transmitter 86, where the message is then subsequently be transmitted to the environmental control system. It is to be appreciated that this system may be adapted such that the transmission of data between the interactive mirror system 38 and the environmental control system 42 may be achieved either through suitable wired or wireless communication means.

The interactive mirror system 38 may also be provided with a local data store 94 which may store data relating to user profile 20A, 20B, 20C information. This data store 94 may be accessed when determining an action to be taken as described above. Furthermore, if, as a result of a user interaction, the preferences associated with a user are changed, the processor 88 may be configured to amend the relevant information stored within the data store 94. Similarly in this instance, the processor 88 may be configured to instruct the transmitter 86 to transmit data relating to this change to an external data store containing user profile 20A, 20B, 20C information, where the information contained therein is to be suitably amended.

It is to be appreciated that in some embodiments of the present system, the system may be suitably adapted such that the elements discussed above are installable within a mobile telecommunications device 12A and the instruction to the environmental control system 42 is enabled by the mobile telecommunications device 12A itself. This may, for example, be achieved by suitably adapting the SFP application 10A so that it is able to carry out this functionality.

Environment Control

The interactive mirror system 38 as described above may be further arranged to send control messages to an environmental control system (ECS) 42, as shown in FIG. 7. The ECS 42 may be arranged to control environmental equipment configured to adjust a variety of environmental settings in the vicinity of the interactive mirror system 38, for example, in a changing room 44 where the interactive mirror system 38 is located. The ECS 42 may be located in the same vicinity as the interactive mirror and environmental equipment, or alternatively may be located in a remote location. The ECS 42 may communicate with the interactive mirror system 38 via a suitable wired or wireless communication method. The environmental settings which may be adjusted in the vicinity of the interactive mirror may include the brightness of lighting 96, colour of lighting 96 or temperature 90. The environmental settings may also be adjusted to simulate dynamic weather conditions, for example by increasing the strength of an air conditioning system to simulate a windy environment, or by using sprinklers 98 in a suitably adapted room to simulate rain. All of these adjustments enable the functionality of the clothing or items for their intended use to tested. For example, a user may wear a dress and want to know whether that dress is suitable to be worn when the temperature is 10 degrees Celsius. The ECS 42 can change the temperature of the changing room to give the user an indication of the functionality of the clothing under this environmental condition. Similarly, another user may wish to see how a pair of jogging shorts feels when they are running; the functional aspect is how the clothing feels when it is being used for its intended function. In this case the floor of the changing room may move to become a treadmill 92 to simulate the environmental conditions of running. Many other environmental conditions can be generated to enable the user to get a good indication of the functionality of the clothing or items.

In one aspect of the embodiments, the interactive mirror system 38 may be configured to send control messages to the ECS 42 upon instruction from a user. This instruction may be enabled by a user interacting with a suitable portion of the interactive mirror touch screen 64. This functionality may be used without the user having the SFP application 10A installed on their mobile device 12A. Alternatively, a user may interact with the application 10A on their device 12A when it has been configured to allow such functionality. The application 10A may be configured to communicate such messages to the ECS 42 wirelessly via the external communications network 18.

In an alternate embodiment, the interactive mirror system 38 may be configured to automatically send control messages to the ECS 42 in response to items which are detected to be in the vicinity of the interactive mirror. In this embodiment, items 36 are detected by the interactive mirror system 38 in accordance with the description provided in the interactive mirror functionality section, and data is subsequently obtained regarding these items, where the data is configured to include information regarding ideal environmental conditions in which this item may be used. For example, if a warm item of clothing or an accessory is detected by the interactive mirror system 38, data retrieved regarding this item may indicate that the temperature in the vicinity of the interactive mirror should be adjusted to reflect this fact (namely reduced). In this case, this would enable the user to feel how effective the clothing or accessory was in that environment. Alternatively, if an item which is designed to be luminous (such as high-visibility clothing worn by cyclists) is detected by the mirror, the lighting may be automatically adjusted to provide a generally dark environment with one bright spotlight directed toward the user. This would enable the user to assess if the clothing or accessory was sufficiently luminous in that environment. Yet further, if an item is detected by the mirror which is designed to be waterproof (such as a raincoat), the ECS 42 may be configured to automatically switch on sprinklers 98 in a suitably adapted room, so that the user may assess the water permeability of the item. The system may also be configured to alert a user of the settings which are about to be changed, and allow them a window of time in which they can cancel this action, either through interaction with the SFP application 10A or with the interactive mirror. In an embodiment, this automatic control of the ECS 42 may be overridden by the interaction of a user, where such an interaction may be achieved as described above, either with or without the use of the SFP application 10A. The ECS 42 may additionally be configured to generate conditions mimicking a location that the item may be expected to be found in to enable a more realistic assessment of the appearance of the clothing or item in that environment. For example, if the item were designed to be worn at the beach, the ECS may place an image of a beach to appear behind the user wearing the item. This may be achieved by transmitting such an image on a display screen 100 behind the user, which the user can then view in the interactive mirror. Alternatively, the ECS may be configured to display such an image on the display screen 60 of the interactive mirror itself. In addition to images, the ECS 42 may be configured to produce scents 102 and/or sounds 104 which replicate scents/sounds found at that location. In the beach example, this may be the smell and/or sound of the ocean. This may be achieved through the release of scented liquids placed in aerosol containers in the vicinity of the interactive mirror, which the ECS 42 may be configured to activate by the use of an appropriate signal, which may be wired or wireless. Audio tracks with appropriate sound files can similarly be played as appropriate to replicate a use environment to enable the functionality of clothing or accessories which cover the user's ears to be tested (for example how does the user's hearing get affected when the user is wearing the hood of a hoodie?). The location mimicking described above may be used in either the user activated embodiment of the ECS 42 functionality, or in the automatic configuration, both of which are described above. The environmental equipment may also further comprise an area of the floor which is configured to be movable as mentioned above, for example, by the provision of a treadmill 92. This may be desirable where a user has selected items of clothing or accessories designed to be worn during exercise and the provision of a movable floor section enables the user to walk, jog or run to determine the comfort of the clothing or accessories during an exercise period, without the user having to leave the additional functionality area of the changing room.

Figure 11:
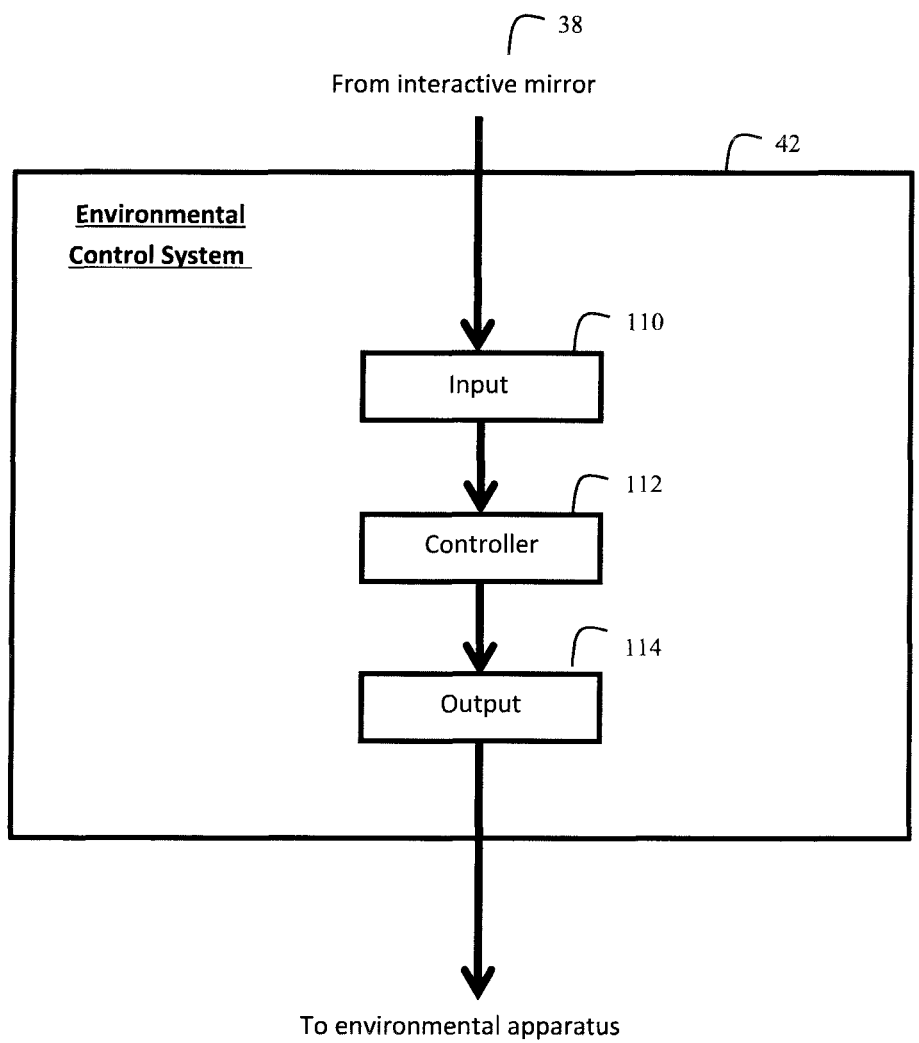
FIG. 11 shows a schematic block diagram, illustrating elements of the environmental control system of FIG. 7.

Turning to FIG. 11, there is shown a schematic block diagram of one embodiment of the ECS 42, which illustrates the elements provided in the ECS 42 of the embodiment. The ECS 42 is firstly provided with an input device 110 which is configured to receive instructions from the interactive mirror 38 which relate to how the provided environmental equipment should be controlled. The determination of the action is described in more detail with reference to the interactive mirror section discussed above. The input device 110 may comprise any apparatus, such as a receiver, which is configured to receive such instructions. The instructions may be received either through wired or wireless communication means. Once the instructions have been received, they are then transmitted to a controller 112 which is communicably coupled to the input 110. The controller 112 is configured to interpret these instructions so as to generate a suitable control message which is to be delivered to one or more pieces of environmental apparatus (where examples of environmental apparatus have been described above). The controller may also be configured to include within the control message which piece of environmental apparatus the instruction should be sent to. This may be specified by the instruction which is received by the input in accordance with an embodiment described above.

Following the generation of the control message, the message is transmitted to an output device 114 which is communicably coupled to the controller 112 and is configured to transmit the control message to one or more pieces of environmental control apparatus (devices). The output device 114 may comprise any apparatus, such as a transmitter, which is configured to receive such instructions. The control message may be transmitted either through wired or wireless communication means. It is also to be appreciated that the input 110 and output 112 devices described above may be combined in a single suitable component, such as a transceiver.

Availability Notification System

A further aspect of the present embodiments is directed toward an automatic notification system which alerts a user that an item which has previously been determined as being of interest to them is available in their geographical vicinity. Presently, in order to determine whether a desired item is available in a particular store, a user must enter the store and search for the item, which takes time. The user may also have no previous indication of whether that item is available, so they may be searching for an item which is not present. In this instance, time is spent by the user in searching for an item, and in addition they cannot achieve their goal of finding the desired item.

In some circumstances, it may be possible for a user to check the availability of an item at a particular location in advance, for example, by using a web-based stock checking system, or by calling the store. However in both of these scenarios, the interaction still requires that the user expends time and effort in order to receive the required information. Moreover, such advance information necessitates that there will be a delay in the user obtaining the information and them reaching the physical location. In that time, the availability of the desired item may have changed and the user may still be unable to obtain the item. To that end, there is provided a feature of the SFP application which enables a user to be notified of the availability of a desired item when they enter the vicinity of a store which has it in stock.

Figure 12:
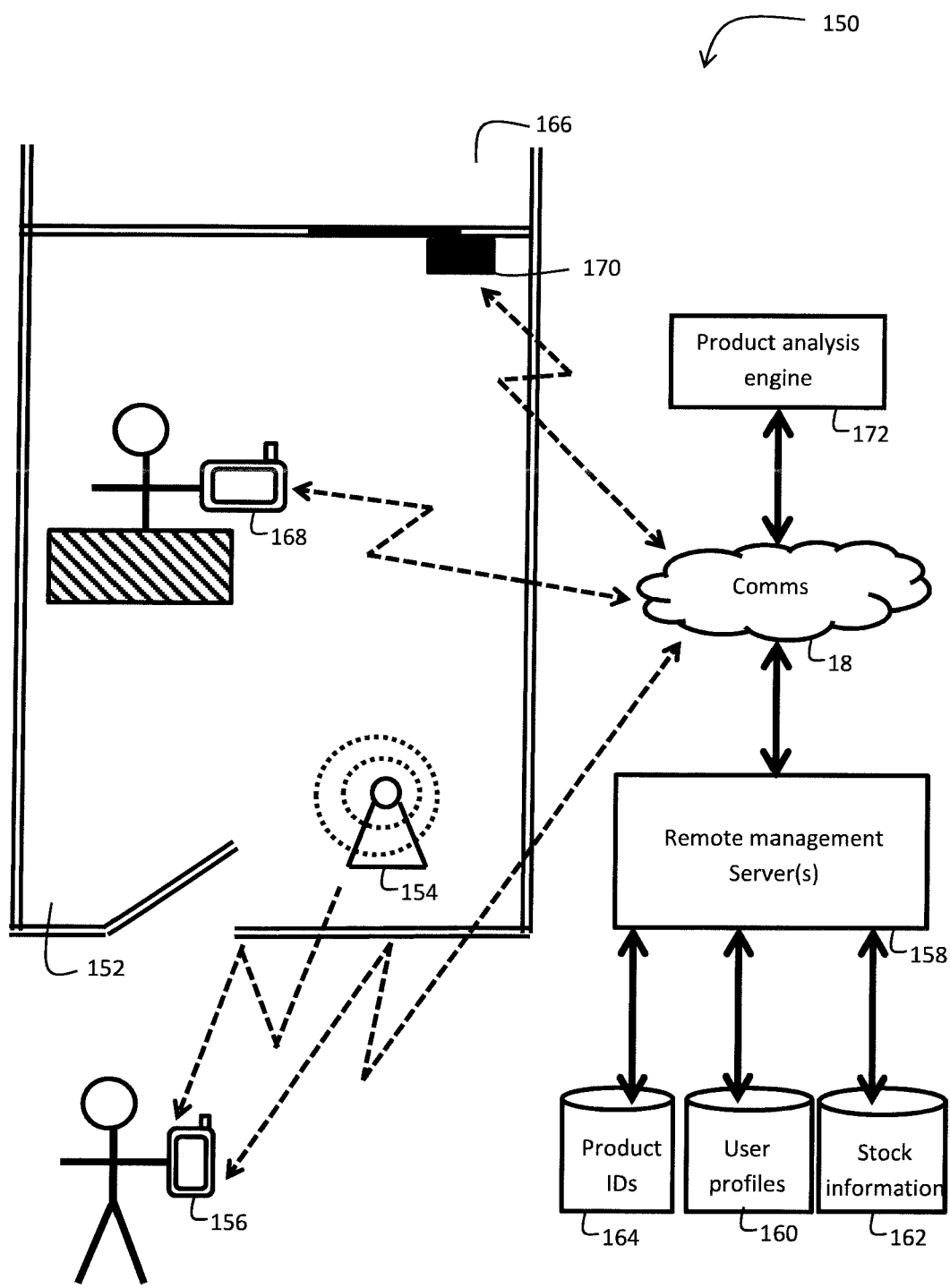
FIG. 12 is a schematic diagram, showing an example of a physical store according to an embodiment of the present invention arranged to provide availability and preparation information of particular items in a store.

FIG. 12 shows an availability notification system 150, and illustrates hardware elements which may be arranged in a physical store 152 in order to allow a user to receive notifications indicating that a desired item is located in that store 152. There is first provided a wireless communications device 154 located within the store 152 which is used to transmit data packets in the form of push communications to a user's mobile telecommunications device 156 which has the SFP application 10A installed on it, to indicate the proximity of the store 152 to the mobile telecommunications device 156 of the user. Such a wireless communications device 154 may comprise a beacon 32 as described previously. Alternatively, the wireless communications device 154 may comprise any form of wireless communications apparatus which enables the communications device 154 to achieve its aim of transmitting a push communication to a user's mobile telecommunications 156 device to notify it of the proximity of the store, such as a Near Field Communications (NFC) device, a Bluetooth transmitter or a Wi-Fi transmitter.

Upon receipt of the push communication from the wireless communications device 154, the user's mobile telecommunications device 156 (more specifically, the SFP application 10A running on the device) is configured to wirelessly transmit user identification data stored within the SFP application 10A to a remote management server 158 via a communications network. This remote management server 158 (or servers) has access to databases having data relevant to the store which the push communication originated from (the proximate store). The remote management server 158 is configured to be able to use the user identification data to identify the user who has just received the push communication and retrieve from a user profile database 160, user profile information associated with the user identification data. The user profile information may comprise any one or more of a previous purchasing history of the user, products which the user has viewed on an online environment relating to the store that the push communication originated from, and a 'wish list' of items which the user has indicated are desired by them (note this could be the same as the wish list mentioned in earlier embodiments described above). It is to be noted that this list of user profile information is for illustrative purposes only and is not an exhaustive list of all possible user profile information.

Where the user profile information comprises a wish list of items, the remote management server 158 may be configured to retrieve the wish list. This wish list may be provided in a format which allows the remote management server 158 to retrieve product identifiers of the items included on the wish list. One such way of achieving this is to denote the desired items as product stock keeping units (SKUs), where the SKU for each type of item is unique. For example, two items which are identical in all ways except for colour may have different SKUs. As a further example, two items which are identical apart from sizing information may also be given different SKUs. The use of SKUs is provided as an illustrative example, and any method which allows the remote management server 158 to retrieve product identifiers of the desired items may be used. In other embodiments, the items on the wish list may be comprised of a combination of keyword identifiers which may be combined to create a unique identifier of each item. By matching these keyword identifiers to keyword identifiers of products stored in a product identification database 164 (typically as metadata of the universal identifier (the unique identifier)), the remote management server 158 may be able to retrieve the product identifier for the product identified on the wish list. This also facilitates a great interoperability between the different inventory systems as they do not have to change the way they describe different items but rather the conversion from the local way in which inventory system describes an item is converted into the universal identifier (such as a SKU) using the product ID database which then allows the user to interact with all the different inventory systems to determine a unified availability of items.

There is also provided a database 162 which indicates the levels of stock held in the proximate store. This database 162 may be maintained in real-time to give an up-to-date indication of the stock levels of all items held within the proximate store, such that each time a product is sold or otherwise removed or added from/to the proximate store, the database 162 is updated with this information. Alternatively, the database 162 may be updated on a periodic basis determined by a user, such that after a predetermined amount of time (for example daily or every few hours), the database 162 is updated to reflect any changes in stock since the last update. The database 162 may be updated through any suitable communication with a stock management system which is configured to receive information relating to the change in stock level of the proximate store. This stock management system may comprise the remote management server 158 described above.

Upon receipt of the product identifiers of the desired items, the remote management server 158 may be configured to compare the product identifiers with the provided stock level information stored in the stock information database 162, to determine whether the identified desired items are in stock at the proximate store. If it is determined that they are, the remote management server 158 may be configured to wirelessly send a communication back to the user's mobile telecommunication device 156, informing them that one or more of their desired items is in stock in the proximate store which they have entered the range of.

Figure 13:
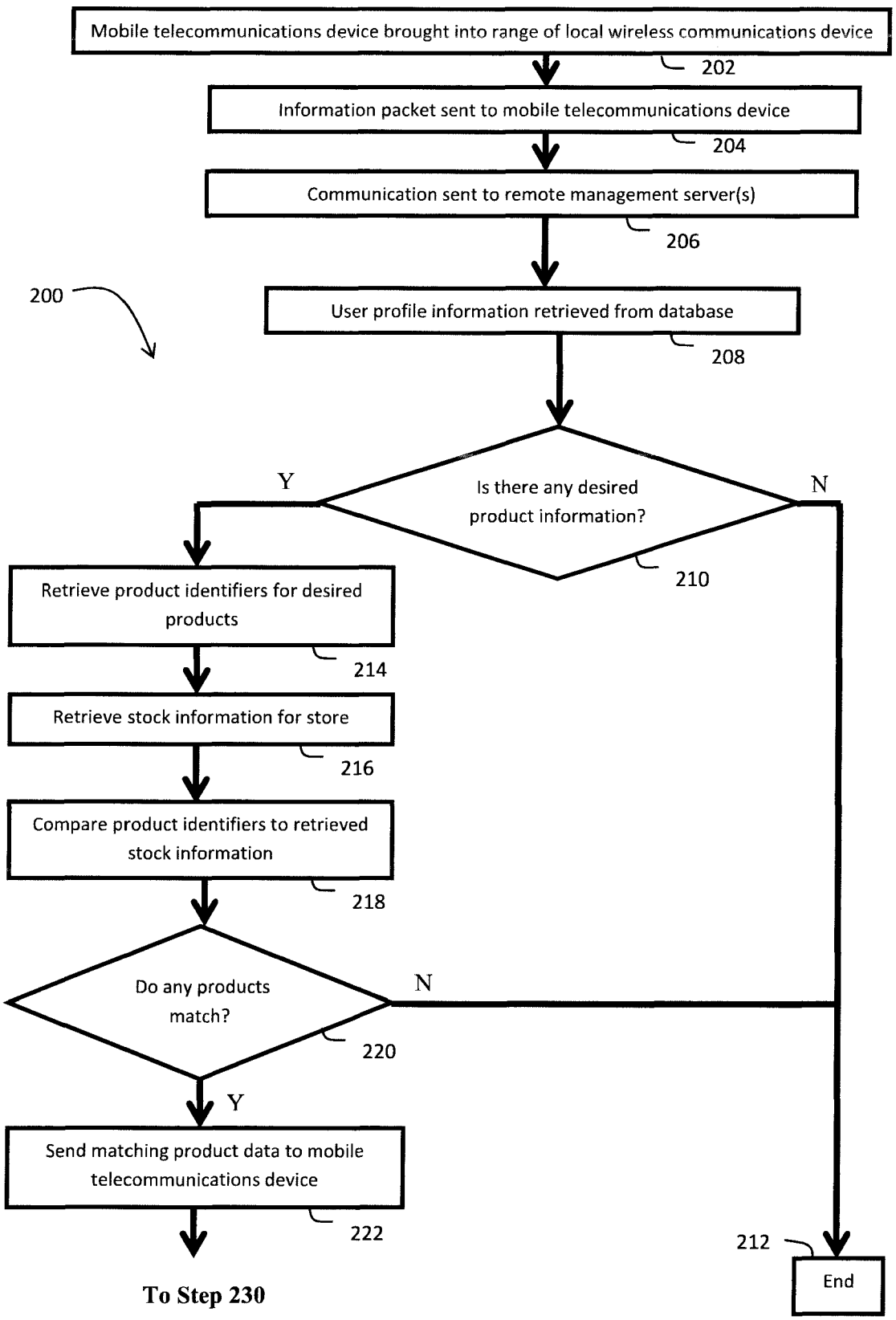
FIG. 13 is a flow diagram, showing a method of providing a user with item availability information for a proximate store using the embodiment shown in FIG. 12.

FIG. 13 shows in detail a method of operation 200 of the availability notification system 150 of FIG. 12. The system commences operation when a mobile telecommunications device 156 is brought, at Step 202, into range of a wireless communications device 154 located in a physical store location 152, in accordance with the embodiments described above. The denoted range may be determined by the maximum range at which the wireless communications device 154 is able to transmit a communication. Alternatively, the denoted range may be set by an operator of the system to be any desired range of the operator. For example, the wireless communications device 154 may be capable of transmitting a communication at a distance of 100 m (metres), but the operator only wishes for the method of operation 200 to be carried out when a mobile telecommunications device 156 is brought within 15 m of the wireless communications device 154. In this instance, the operator may adjust the settings of the wireless communications device 154 such that it only performs the method of operation 200 when a mobile telecommunications device 156 is detected as being within 15 m of the device.

Once a mobile telecommunications device 156 is determined as being in range, an information packet is sent, at Step 204, to the mobile telecommunications device 156. This information packet may be configured in accordance with any one of the embodiments described above. Once the information packet has been received by the mobile telecommunications device 156, the device proceeds to send, at Step 206, a communication to the remote management server 158. This communication may be configured to provide user identification data relating to the owner of the mobile telecommunications device 156, in accordance with any one of the embodiments described above. In addition, the communication may be configured to send identification information of the proximate store that the initial information packet was sent from. This identification may be initially be provided by the information packet which is sent by the wireless communications device 154.

Upon receipt of the wireless communication from the mobile telecommunications device 156, the remote management server 158 is configured, at Step 208, to retrieve user profile information associated with the user identification data. The remote management server 158 may then be configured to determine, at Step 210, whether the retrieved user profile information comprises any desired product information. This information may comprise any form of data which indicates that the user has expressed interest in purchasing a particular item. This may, for example, comprise of items which the user has previously placed in an online 'shopping basket,' but has not purchased. This may also comprise, as previously discussed, a 'wish list' of items which the user has previously selected on an online environment. The items on this list may also be specified by colour and size which is relevant to the user.

If it is determined, at Step 210, that there is no desired product information of any form, then the method of operation 200 proceeds to Step 212 and the method ends and waits for another mobile telecommunications device 156 to be brought within range of the wireless communications device 154. If however it is determined, at Step 210, that there is desired product information, then the method 200 proceeds to retrieve, at Step 214, the relevant product identifiers of the desired products from a product identification database 164. These product identifiers may comprise any identification method which allows a particular product to be identified uniquely in accordance with any of the above embodiments.

Following the retrieval of the product identifiers, the method 200 then continues by retrieving, at Step 216, stock information for the particular store 152 currently associated with the wireless communication device 154 which, at Step 204, sent the information packet to the mobile telecommunications device 156 (the proximate store). This information may be retrieved from an updated stock information database 162 in accordance with embodiments discussed above. The stock information database 162 may contain information regarding the stock levels of all items which are provided by the proximate store 152. As above, each product in the stock information database 162 may be denoted by a unique product identifier which allows each stock item to be distinguished from others. In some embodiments, different product identifiers may be given to items which differ in any way, such as by colour or by size.

Once the stock level information has been retrieved, the method 200 continues by comparing, at Step 218, the previously retrieved product identifiers with the retrieved stock level information to determine whether the proximate store 152 has any of the user's desired items in stock. This may be achieved by direct comparison of the unique product identifiers retrieved from the product identification database 164 and the unique product identifiers used to denote the products in the stock information database 162, in the case where the identifiers used in each database are the same. In the case where the two sets of product identifiers are not in the same format, the remote management server 158 may be provided with a look up table which provides a correspondence mapping between the two sets of product identifiers. In this way, the remote management server 158 would still be able to perform a comparison between the two sets of information.

Once the comparison has been performed, the method of operation 200 continues by determining, at Step 220, whether any of the desired items match those that are in stock at the proximate store 152. If it is determined that there are no matching product identifiers, the method proceeds to Step 212, where the method 200 ends and awaits another mobile telecommunications device 156 to be brought within range of the wireless communications device 154. In some unseen embodiments, if it is determined that there are no matching product identifiers, before the method 200 ends the remote management server 158 may be configured to retrieve data which links to an online retail environment where the desired items are purchasable. The remote management server 158 may then transmit this data to the user's mobile telecommunications device 156. Once this data is received, the data may be configured to cause a notification to be displayed on the user's mobile telecommunications device 156 which indicates that their desired products are not available at the proximate store 152, but that they can be purchased on the online environment by using the provided link.

If however it is determined at Step 220 that there are one or more matching product identifiers, the method of operation 200 instead proceeds to send, at Step 222, the matching product data to the user's mobile telecommunications device 156 to inform them that the relevant desired item(s) of the user are available in the proximate store 152. This information may for example be sent in the form of a push notification, where once the notification is received by the mobile telecommunication device 156, it causes the SFP application 10A to open a dialogue box on the screen of the device 156 which displays the items available in the proximate store 152. The notification may also comprise causing the mobile telecommunications device 156 to vibrate, alerting the user that they have received a notification.

Notification, Preparation and Reservation System

A yet further aspect of the embodiments is directed toward a preparation and reservation system which, upon being alerted that a desired item is available in a proximate store, a user may request that those items be prepared and left in a locked changing room 166 in that store which the user is able to access. Presently, in order for a customer to try on an article of clothing or other item available in a store, they will first be required to locate the item in the store. This can be unnecessarily time consuming, particularly in cases where a customer knows which item they want and are unable to find its location in the store quickly, either because the user is unfamiliar with the store or because the item is not available. The present aspect of the embodiments enables a customer to be informed of the availability of a desired item in a proximate store 152, and upon receiving this information, the customer may indicate that they wish for the item(s) to be prepared and left for them in a changing room 166 of the store 152. This preparation system also comprises a means of ensuring that only the customer who has made the request is able to access the changing room 166 with the prepared item(s). In an example of the present aspect of the embodiments, the preparation and reservation system is intended to be provided in conjunction with the availability notification system 150 previously described which enables the customer to be informed when a desired item is available. However, it is to be appreciated that any suitable method of informing the customer of available items (desired or otherwise) in a proximate store 152 may be used in conjunction with the preparation and reservation system. Returning to the arrangement of FIG. 12, there are further features provided which enable the functionality of the preparation and reservation system described above. For the purposes of this description, it will be assumed that some features of the preparation and reservation system will be shared with the features of the availability notification system described above, such that the full system is able to notify a user of the availability of desired items, and then subsequently allow them to use the functionality of the preparation and reservation system. It is to be understood that this is one example embodiment and that the preparation and reservation system may be provided in isolation.

Further to features described previously, there is also provided one or more boutique assistant devices 168 (typically smart phones or tablet computers) which have the SFP application 10B installed on them. In this embodiment, the boutique assistant devices 168 are configured to be able to wirelessly transmit and receive data to/from the remote management server 158 described previously via a communications network 18. The data which is transferred may comprise information regarding desired items which have been requested by the user, in accordance with embodiments described above.

In this aspect, there is also provided one or more electronic locks 170, which are configured to be positioned on the door of a respective changing room 166. The electronic locks 170 are further configured to allow access to the changing room 166 upon the input of a specific code. Alternatively or in addition, user biometrics can be provided in an item request and can be used to enable the lock to be opened. This code may be configured such that each lock 170 has one code which enables access to the changing room 166, and that the code for the lock 170 does not change. Alternatively, the code may be configured such that it may be changed after one or more uses. In this regard, the unlock code may be provided in some embodiments as an NFC code which can be used on the mobile telecommunications device to enable the device to open the electronic lock by being brought into proximity with the lock. The electronic lock 170 may be further configured to be able to transmit and receive data wirelessly to/from the remote management server 158. The changing room may also comprise a sensor for determining if the changing room is occupied or not. This can be used as a precondition for enabling the door to be locked when being used in response to a request for an item to be tried on.

Figure 14:
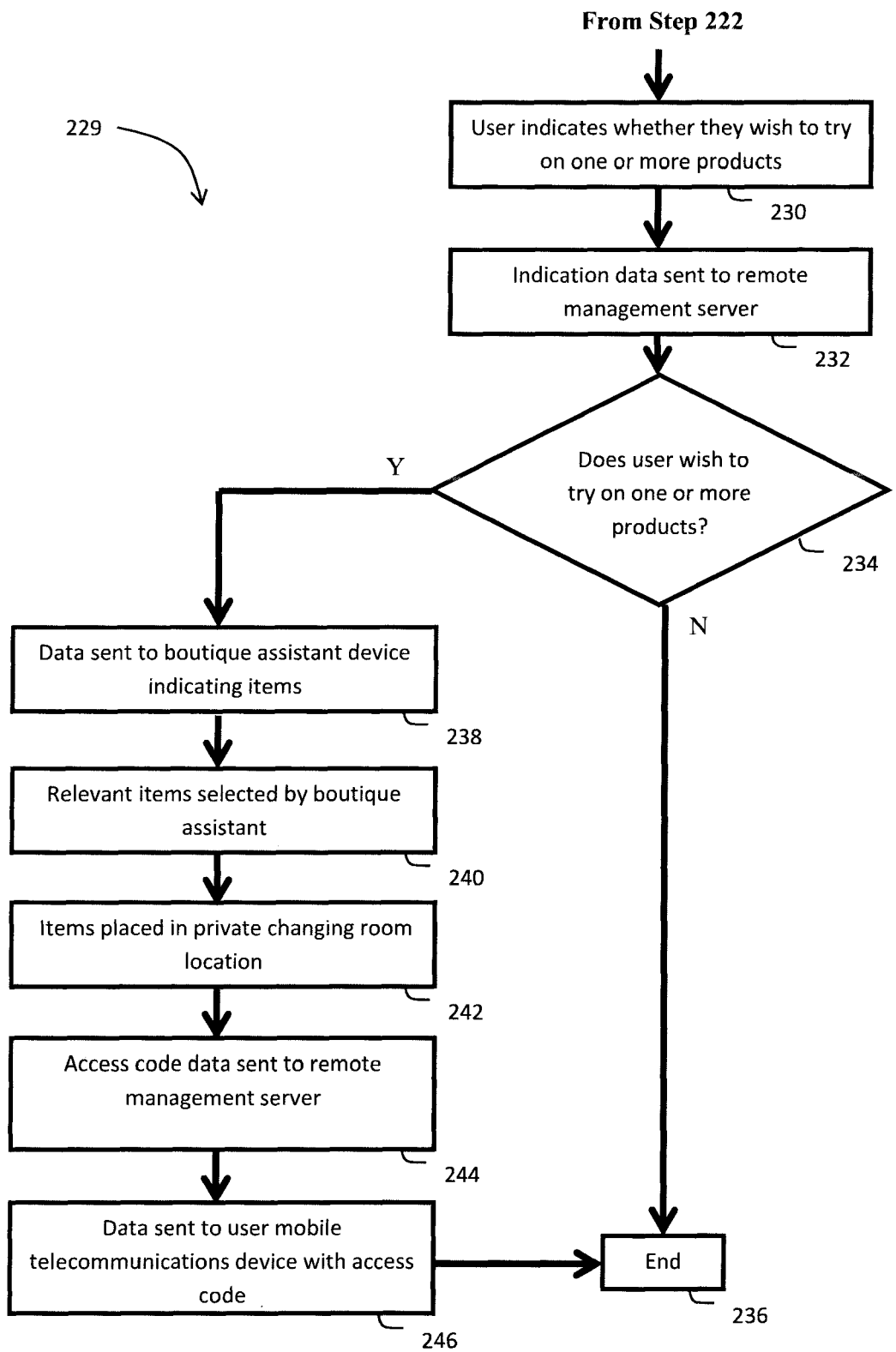
FIG. 14 is a flow diagram, showing a method of allowing a user to request items be prepared for them in a proximate store using the embodiment shown in FIG. 12.

FIG. 14 shows in detail a method of operation 229 of the preparation and reservation system as described above. The method of operation 229 which is described assumes that it will follow the methodology described above regarding the availability notification system, although it is to be appreciated that the present method 229 may be adapted such that it can operate in conjunction with any suitable notification system.

The method of operation 229 begins when the user receives, at Step 222 of FIG. 13, a list of products desired by the user which have been determined as in stock at the proximate store 152. Once this information has been received, the user is prompted to indicate, at Step 230, whether they wish to try on one or more of the available items which has been provided. This may be achieved by the user interacting with their mobile telecommunications device 156 in a manner which either indicates that they wish to try on a particular item, or that they are not interested in doing so. An example of this is the user using a touch screen interface on their device to interact with either a 'yes' or 'no' indicator for each item. Additionally or alternatively, the user may be provided with a single command which allows them to indicate that they wish to try on all of the items, or that they are not interested in any of the items.

Figure 14A:
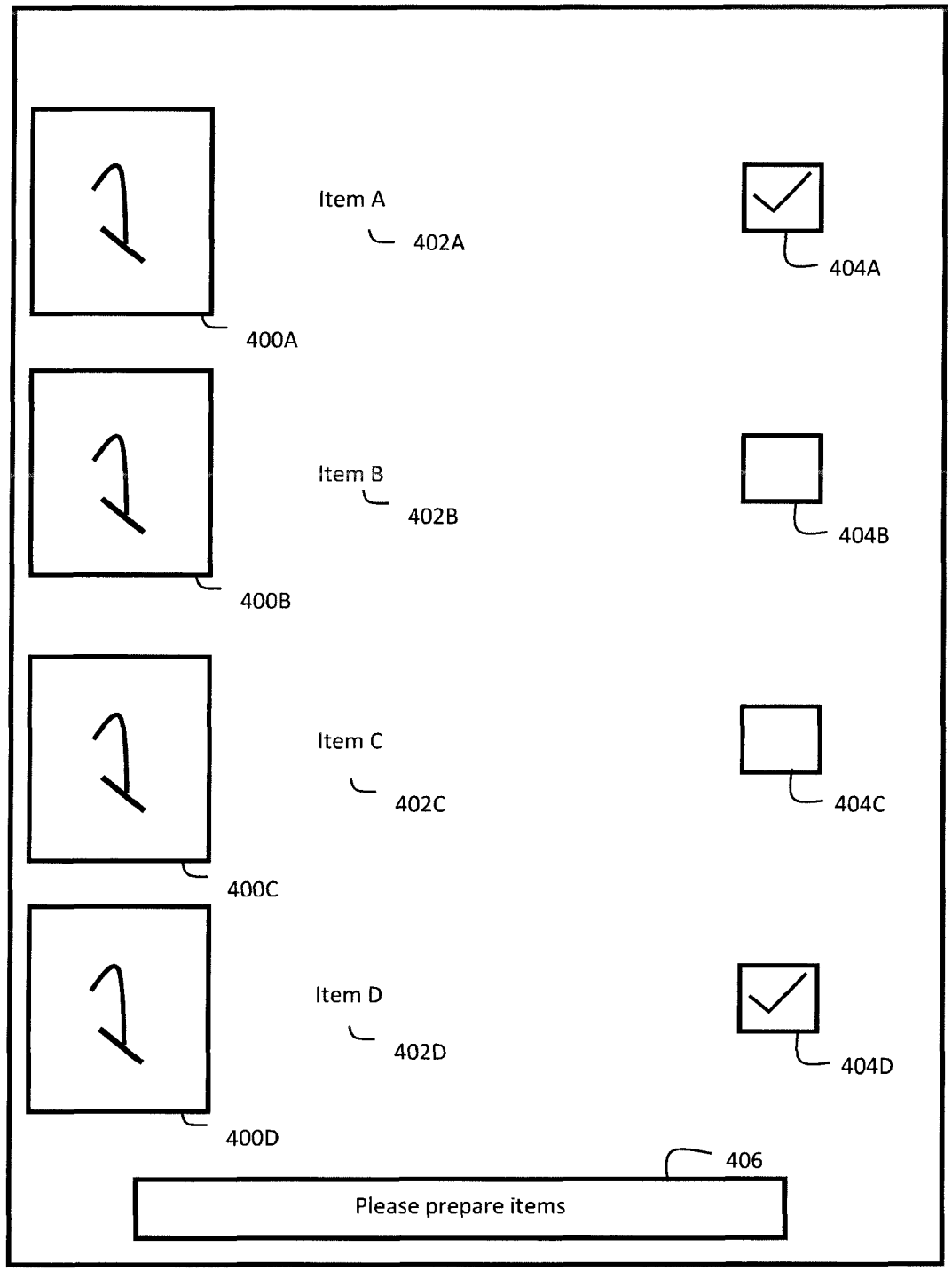
FIG. 14A is a schematic diagram, showing an example of an item preparation selection screen which may be displayed in the software application of FIG. 1 in an embodiment.

An example of such an interface to be displayed on a user's mobile telecommunications device 156 is shown in FIG. 14A. Here there are shown a plurality of pictures of items of interest to the user 400A, 400B, 400C, 400D which have been identified as being in stock in the proximate store 152. There are also shown verbal descriptions of these items 402A, 402B, 402C, 402D which in conjunction with the pictures of the items 400A, 400B, 400C, 400D are used to identify to the user which items are available. It is to be appreciated that the number of items shown is for illustrative purposes only and may vary in accordance with the number of available desired items. Similarly, whilst both pictures 400A, 400B, 400C, 400D and verbal descriptions 402A, 402B, 402C, 402D are illustrated, in other embodiments, the exact information shown may vary and different information may be displayed which may allow the user to identify the available desired items.

There are also shown selection boxes 404A, 404B, 404C, 404D which a user may interact with in order to indicate that they wish for a particular item to be prepared. In boxes 404A and 404D, there are shown boxes which the user has interacted with to indicate they wish for an item to be prepared, whereas in boxes 404B and 404C, there are shown boxes which the user has not interacted with indicating they do not wish for the item to be prepared. Such interaction may occur, for example, by the user interacting with the specified locations on their mobile telecommunications device 156 via a touchscreen, or other suitable interaction method. Finally, there is also shown a further box 406 which the user may interact with once they have finished selecting desired items for preparation to indicate their final selection.

Returning to the method of operation 229 of FIG. 14, once the user has indicated which items they wish to try and which they are not interested in, their response data is sent, at Step 232, to the remote management server 158. The remote management server 158 then determines, at Step 234, whether the user wishes to try on any of the desired items in stock. If it is determined that they do not, the method 229 then proceeds to Step 236 where the method 229 ends. If however it is determined that the user does wish to try one or more of the desired items, data relating to the relevant items is sent, at Step 238, to the boutique assistant device 168 in order for the information to be viewed by the boutique assistant who operates the device 168. This may be sent via the external communications network 18.

In some unseen embodiments, when the boutique assistant has received the relevant item data, the remote management server 158 will also send data to the user's mobile telecommunications device 156 indicating an approximate time at which the items are expected to be ready to try on. This approximate time may be a time which is a predetermined period after the boutique assistant device 168 receives the relevant item data. Alternatively, the system and method may be configured such that upon receiving the relevant item data, the boutique assistant provides an approximate time at which they believe the items will be ready. This will allow for the boutique assistant to take into account a variety of external factors, such as number of customers who are currently waiting, availability of changing rooms and where the items need to be retrieved from.

Once the item data has been received by the boutique assistant device 168, the relevant items are then selected, at Step 240, by the boutique assistant. This may comprise the assistant selecting the items from their locations within the store 152. Alternatively, this may comprise the assistant retrieving the items from a stock room, or any suitable location in which the relevant items are held. Once the item(s) have been selected, the boutique assistant then proceeds to place, at Step 242, the selected items in the private changing room location 166. This location will be a location that is provided with the electronic lock 170 discussed above. It is to be appreciated that the boutique assistant will be allowed access to the changing room 166 in order to place the items in the room. This may comprise the assistant having a code which can disengage the lock 170. Alternatively, the lock 170 may only be configured to engage once items have been placed in the changing room 166. Such a configuration may be enabled by the boutique assistant enabling the locking mechanism once they have left the changing room 166. In further embodiments, the changing room 166 may be configured to detect that items have been brought into the changing room in accordance with embodiments discussed above, and upon detection, may engage the lock 170 the next time that the changing room door is closed. Any suitable mechanism may be used which allows access to the changing room 166 to be restricted once the items have been placed in the room.

Once the items have been placed in the changing room, the method then proceeds to send, at Step 244, access code data to the remote management server 158. This is then sent, at Step 246 to the user's mobile telecommunications device 156 which permits them access to the changing room 166 containing the requested items. In one embodiment, this may comprise data being sent which causes an access code to be displayed on the user's mobile telecommunications device 156 which, when inputted on the electronic lock 170, will grant access to the relevant changing room 166. In some embodiments this can be a NFC identifier which the user can use to unlock the changing room. In other embodiments, the data may comprise a notification being sent to the user's mobile telecommunications device 156 informing them that their requested items are now available to try on, and when they arrive, a boutique assistant will be available to let them into the relevant changing room 166. Once the data has been sent, at Step 246, to the user's mobile telecommunications device 156, the method of operation 229 then proceeds to end at Step 248.

Similar Product Recommendation System

Another aspect of the present embodiments is directed toward a system which, in addition to notifying a user that a desired item is available in a proximate store 152, will also determine whether there are any items which are similar to the desired item and will also notify the user of their availability in the proximate store 152. Such similarity may comprise the desired item and the similar item having matching key parameters. These key parameters may comprise, for example, a distinct type of pattern, an overall design or simply a matching colour. These items do not necessarily need to be the same type of item of clothing or accessory, but may be suggested for their complementary nature (i.e. a pair of trousers which would be considered to 'match' a top). This determination of complementary items may be carried out manually and simply stored in the information relating to each item or may be provided at the remote management server 158 as product IDs are retrieved. Alternatively artificial intelligence systems (not shown) can be used to learn relationships between different items which are considered by stylists to be complementary to the user selected items and this machine-learned relationship can be applied to all available items to select the ones that can be recommended as complementary by the system. Whatever embodiment is used, the complementary relationships of the complementary items are known before the availability search is carried out. The notification of this similar or complementary item may be achieved in accordance with the method of operation 200 described in FIG. 13. Furthermore, once the user has been notified of the availability of the similar or complementary item, they may also be able to request that the item be prepared and left in the changing room 166 of a proximate store 152, in accordance with the method 229 of FIG. 14.

Returning to the arrangement previously described in FIG. 12, for the purpose of achieving the functionality of this aspect of the embodiments, there is also provided a product analysis engine 172 which is communicably coupled to the external communications network 18. Through this communications network, the product analysis engine 172 is able to communicate with the remote management server 158 which has previously been described. The product analysis engine 172 is configured to receive data regarding the retrieved desired items of a particular user as well as data relating to all other items which are available. It is then further configured to analyse the data to determine key parameters of the desired item or items. This may be achieved by a form of image analysis which identifies key aspects of the desired item or items. On the basis of this analysis, the product analysis engine 172 then determines other items which have key parameters which match those of the desired item. Key parameters may be denoted in the form of metadata tags associated with the data of each item. These metadata tags may be used to establish a predetermined relationship between a plurality of items, for example, two items with the same metadata tag may be assumed to be similar items in the context of the present description. Alternatively, it may be required that two items must share two or more metadata tags in order to be considered similar. Furthermore, the metadata tags for each item may be unique and in this scenario, there is a predetermined relationship which is established between metadata tags to indicate the similarity of the items.

Data relating to these similar items is then configured to be transmitted back to the remote management server 158. An example of the way in which this analysis is achieved is discussed further in European Patent EP2955645B (the contents of which are incorporated herein by reference).

Figure 15:
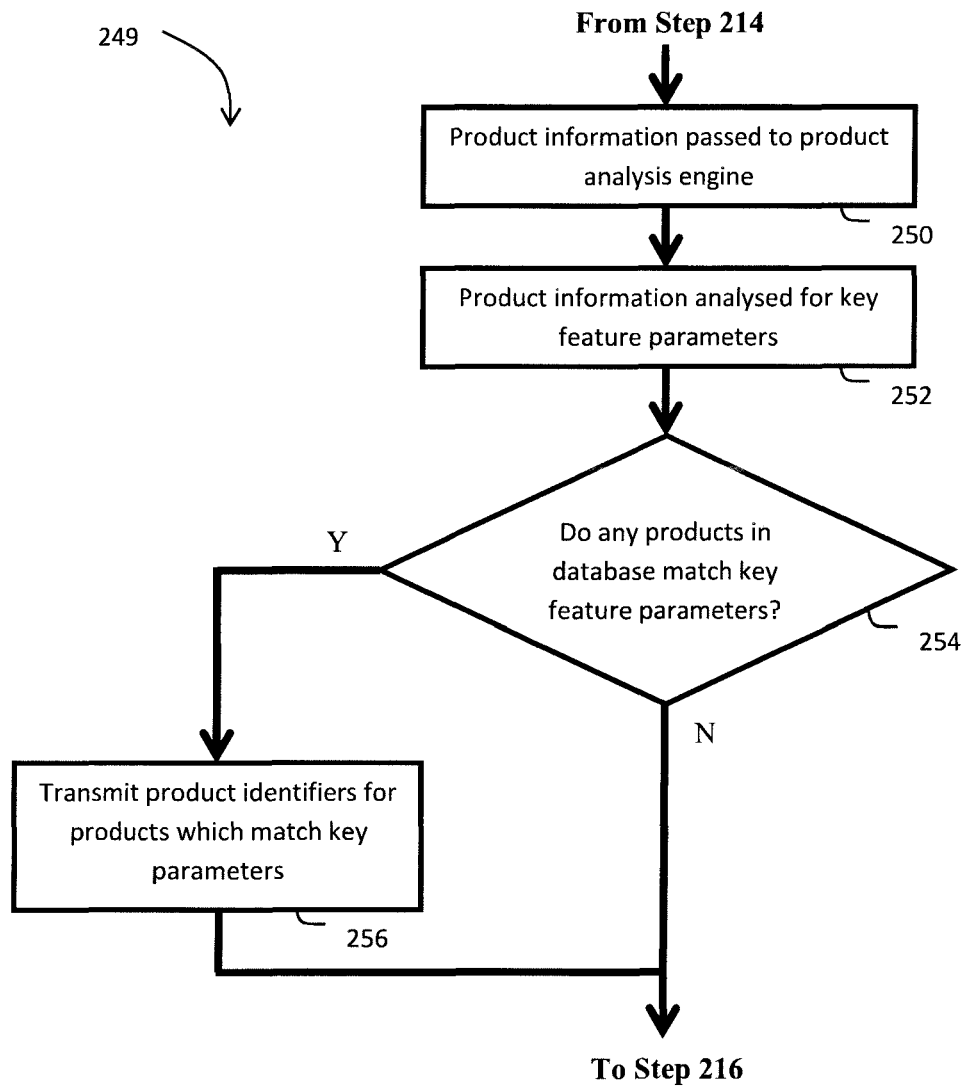
FIG. 15 is a flow diagram, showing a method of identifying items that are similar to items desired by a user using the embodiment shown in FIG. 12.

FIG. 15 describes in more detail a method of operation 249 of the similar product recommendation system. The method 249 begins when the remote management server 158 retrieves, at Step 214 of FIG. 13, product identifiers of the desired item or items of the user and information relating to all other available items in the product identifier database 164. In this case, product identifiers that are retrieved may also comprise of an image of the item or items. Once this information has been retrieved, the information is passed, at Step 250, to the product analysis engine 172 through the use of the external communications network 18. The product information is then, at Step 252, analysed for key feature parameters in accordance with embodiments described above and in European Patent EP2955645B.

It is then determined, at Step 254, whether there are any other products whose data has been retrieved from the database 164 which have key feature parameters which match those of the analysed desired item or items. This determination may, in some embodiments, comprise further analysing the product information of these other products to determine their key feature parameters. Additionally or alternatively, the product data which has been retrieved for these other items may comprise information relating to the key feature parameters of those items. In some embodiments, this information may also be available for the desired items of the user. In this case, the analysis may simply comprise a matching between the two sets of key feature parameters as provided, to determine whether there are any matches.

In some embodiments, where key feature parameters for an item have been determined through image (or other) analysis, the product analysis engine may be further configured to transmit this information to the remote management server 158, which then subsequently stores this information in the product identification database 164. It may be stored in such a way that it is retrievable at a later point upon further key parameter matching determination.

Returning to the method 249 of FIG. 15, if it is determined, at Step 254, that there are no other products which match the key feature parameters of the desired item or items, the method 249 then proceeds to Step 216 of FIG. 13, where stock availability information is determined. If however it is determined at Step 254 that there are other products which match the key parameters of the desired item, the method of operation 249 proceeds to transmit, at Step 256, the product identifiers for the other products which have been determined as matching the key parameters of the desired item. The method then proceeds to Step 216 of FIG. 13, where stock information for the proximate store is determined. The stock information will then be compared to the product identifiers of both the identified desired items and the product identifiers of the determined matching products.

Centralised Product Management System

Another aspect of the present embodiments is directed toward a system which allows a user to be provided information regarding the availability of desired items in a plurality of nearby stores after entering the vicinity of one of these stores (the proximate store as described above). Whether a store is nearby may be determined in a plurality of ways. For example, it may be determined that a store is nearby if it is within a certain distance of a user. Furthermore, such a system is provided which allows this information to be obtained without each of the individual stores needing to have access to the stock information of any of the other stores. This may be advantageous in situations where it is desirable that a user may wish to have access to a plurality of different independent stores within a single software application, but where it is not desirable for each of the stores to have access to the stock information of the other independent stores. The independent stores are characterised by having independent stock control systems which are not centrally controlled. This may also be advantageous in allowing a user to see the availability of items in any reasonably geographically close location, rather than just in the store from which they have entered the vicinity of (the proximate store as described previously). In this situation, a user may be able to plan their activities in dependence upon this information, rather than travelling to a store which has no items in stock in which they are interested. It also avoids the user from having multiple different apps related to each different independent store or chain of stores. For the remainder of this description, any such nearby store which is not the proximate store will be denoted as a 'neighbouring' store. A neighbouring store may become a proximate store depending on the location of a user.

Figure 16:
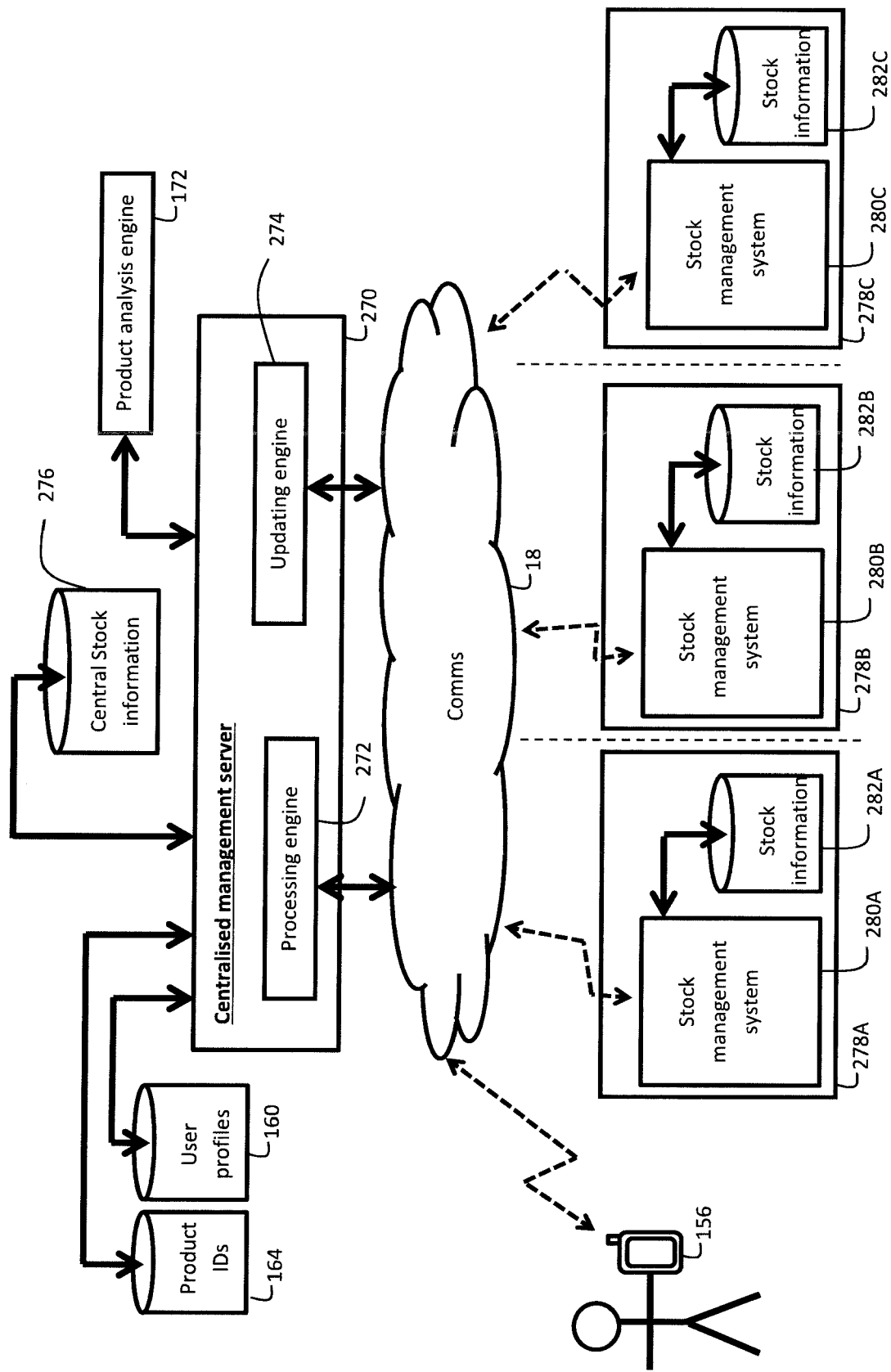
FIG. 16 is a schematic diagram, showing an example of a centralised management system suitable for managing the stock information of a plurality of stores.

FIG. 16 illustrates a centralised product management server 270 directed toward the functionality described above, and illustrates hardware elements, which are used to achieve this functionality. Several features of the arrangement of FIG. 16 share a similar functionality to corresponding features of the arrangement of FIG. 12, but their arrangement within the present embodiment is comparatively altered. For brevity, the functionality of these elements will not be described again, but where the arrangement within the system has been altered, the relevant connections will be described.

In this system, there is first provided a centralised management server 270 which is configured to receive data from a user's mobile telecommunications device 156 through communicable coupling to a wireless communications network 18. In particular, this data may be received when a user enters the range of a proximate store which is part of the centralised management system 270. The functionality of the centralised management server 270 is analogous to that of the remote management server 158 of the arrangement of FIG. 12 in determining desired items of a user and determining whether there are any of these items in stock. To that end, there is also provided a product identification database 164 and a user profile database 160 which have the same functionality as the equivalently named features of the arrangement of FIG. 12. There is also optionally provided a product analysis engine 172 which, if included, enables the similar product recommendation system functionality as described in the method of FIG. 15 in the context of the present centralised embodiment. In the present arrangement, there is also provided a central stock information database 276 which is configured to be communicably coupled to the centralised management server 270. The central stock information database 276 is configured to hold information regarding the stock levels of all items of the stores 278A, 278B, 278C (both the proximate and neighbouring stores) which the centralised management server 270 is configured to have access to. The information may comprise information regarding the products which are supplied by each store, the stock levels of those items and the store 278A, 278B, 278C in which they originate from. However it is to be appreciated that the centralised management server 270 does not control or manage the stock levels with each of the independent stores 278A, 278B, 278C. Rather it simply is updated with the current stock levels of each independent store 278A, 278B, 278C to provide an overall picture of the availability of stock across these stores 278A, 278B, 278C and therefore within any specified geographical location.

The centralised management server 270 comprises a processing engine 272 and an updating engine 274. The processing engine 272 is configured to receive and transmit information from/to a user's mobile telecommunications device 156 and is arranged to achieve the functionality of providing a user with information regarding the availability of stock in the stores 278A, 278B, 278C, which are part of the centralised management system. This is in accordance with methods described in FIGS. 18 and 19, which will be described further below. The updating engine 274 is arranged to update the information contained in the central stock information database 276 with accurate information provided by the stores 278A, 278B, 278C that are part of the centralised management system. This is in accordance with methods described in FIG. 17, which will be described later.

There are also provided one or more stock management systems 280A, 280B, 280C, with each stock management system being configured to update the stock levels of a particular store 278A, 278B, 278C. There is also provided a stock information database 282A, 282B, 282C for each store which is communicably coupled to the stock management system 280A, 280B, 280C of that store. The stock management system 280A, 280B, 280C of each store is configured to update the stock information database 282A, 282B, 282C of the corresponding store upon determination that the stock level has changed. The stock information database 282A, 282B, 282C of each store may also be manually updated through direct input of updated information into the database 282A, 282B, 282C via use of a suitably adapted updating engine (not shown) which is separate to the stock management system 280A, 280B, 280C of the store 278A, 278B, 278C. This may be useful in an embodiment where the stock management systems 280A, 280B, 280C, which communicate with the centralised management server 270, are located remotely from the store 278A, 278B, 278C but are configured to communicate with the stock information database 282A, 282B, 282C (which is located within the store). This allows the management of each store 278A, 278B, 278C to be distributed to a location outside of the store, whilst being able to also manage the stock of the store 278A, 278B, 278C. This may be the case where the stores themselves may be part of a stock management system configured to manage stock levels of each store, which is separate to the centralised management system discussed in the present embodiment.

The stock management system 280A, 280B, 280C of each store 278A, 278b, 278C is also configured to receive requests from the centralised management server 270, where the requests are configured to ask for the current stock levels of each item available in that store 278A, 278B, 278C. Upon receipt of the request, the stock management system 280A, 280B, 280C then retrieves the current stock levels from the stock information database of that store 278A, 278B, 278C, and subsequently provide this data to the centralised management server 270. This data is then stored in the central stock information database 276. These requests may be configured such that they occur persistently and in real-time. Alternatively they may be configured to occur on a periodic basis, where the period between updates is set by a user of the system (for example each hour or day).

Figure 17:
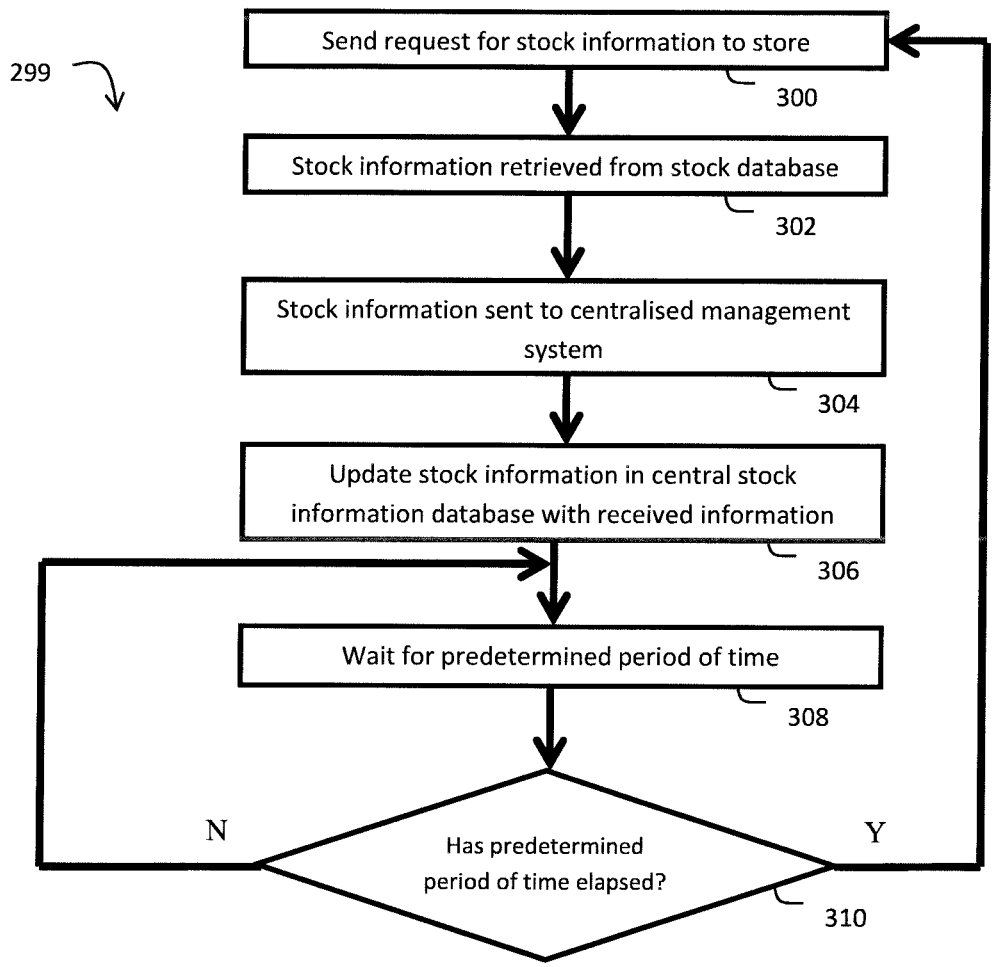
FIG. 17 is a flow diagram, showing a method updating the stock information relating to one or more stores by the centralised stock management system of FIG. 16.

Turning to FIG. 17, there is shown in detail a method of operation 299 through which the centralised management server 270 requests stock level information from the stock management system 280A, 280B, 280C of one or more stores 278A, 278B, 278C. These stores 278A, 278B, 278C may comprise both the proximate and neighbouring stores. The method of operation of FIG. 17 shows the process for a single store. It is to be appreciated that this method 299 can be performed for a plurality of stores and that the method may be carried out simultaneously or consecutively for each of the plurality of stores.

The method 299 begins when the centralised management server sends 270, at Step 300, a request for stock information to the stock management system 280A of the store 278A. Upon receipt of this request, the stock management system 280A then retrieves, at Step 302, the stock level information of the store from the stock information database 282A. Once this information has been retrieved, the information is subsequently sent, at Step 304, back to the centralised management server 270.

Upon receipt of the stock level information, the centralised management server 270 then updates, at Step 306, the stock information for that store in the central stock information database 276. The stored information may comprise the stock level of each item available from the store, as well as an identifier of the store for which the stock information relates to.

Once the information has been stored, the centralised management system then waits, at Step 308, for a predetermined period of time before performing any further action. This predetermined period of time may be set by a user of the centralised management server 270. If it is determined, at Step 310, that the predetermined amount of time has elapsed, the method 299 returns to Step 300 and a new request for stock information is sent to the store management system 280A of a particular store 278A. If the predetermined time has not elapsed, the method 299 instead continues to wait until it can be determined that the predetermined time period has elapsed. In embodiments in which the stock information is updated in real-time (typically where the number of stock level changes is low), this waiting step may be omitted and requests are instead persistently sent for updates of the stock levels of each store 278A, 278B, 278C.

Figure 17A:
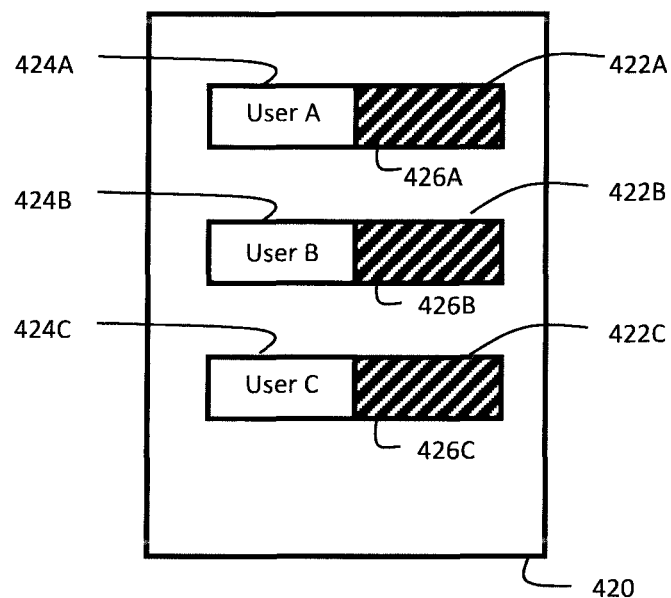
FIG. 17A is a schematic block diagram, illustrating an example data structure record in a user profile database.

Turning to FIG. 17A, there is shown a schematic example database record structure 420 for records in the user profiles database 160. For each record 422A, 422B, 422C in the database 160, the record is shown as comprising an identifier 424A, 424B, 424C of the user that the record is associated with. This identifier may take the form of any unique identification number (such as a hashed key) which can distinguish between the identification of each user. There is also shown a wish list of items 426A, 426B, 426C for each record 422A, 422B, 422C. This wish list may be comprised of products which the user has identified as being of interest, in accordance with embodiments described above. It is to be appreciated that the number of records shown is for illustrative purposes only. Furthermore, the records may also comprise additional information beyond an identifier and a wish list, such as purchasing behaviour patterns and payment details.

Figure 17B:
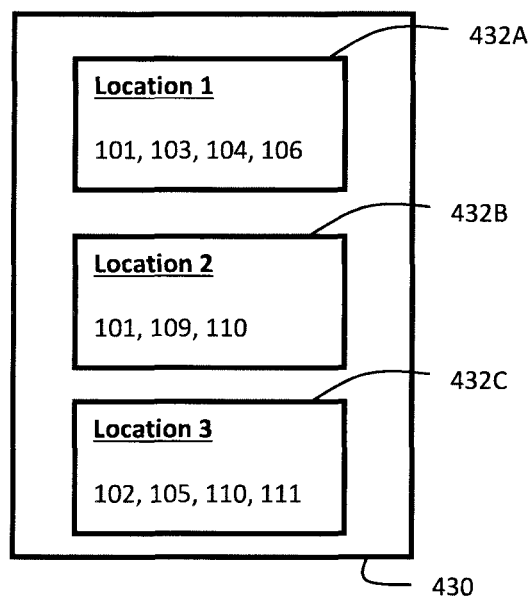
FIG. 17B is a schematic block diagram, illustrating an example data structure record in a central stock management database.

Turning to FIG. 17B, there is shown an example database record structure 430 for records in the central stock information database 276. In the database 276, there is a plurality of records 432A, 432B, 432C, with each record being associated with a different location (store). Each of the records 432A, 432B, 432C contains information in the form of product identifiers that are in stock at each store. In alternative embodiments, the record may contain product identifiers for all products that may be available at that store, with additional information relating to the number of each of these items that is presently located at that store.

Figure 17C:
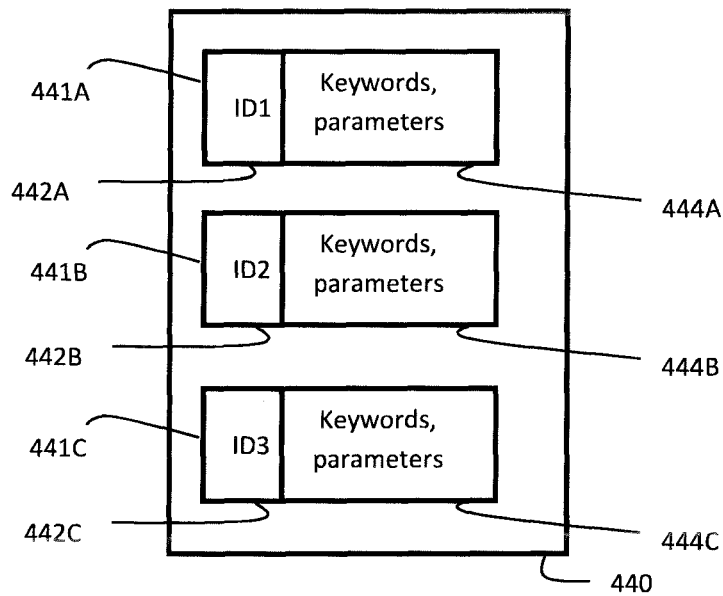
FIG. 17C is a schematic block diagram, illustrating an example data structure record in a product identification database.

Turning to FIG. 17C, there is shown an example database record structure 440 for records in the product identification database 164. In the database 164, there is a plurality of records, 441A, 441B, 441C, each of which comprises an identifier 442A, 442B, 44C of a particular product, and a list of keywords 444A, 444B, 444C which may be used to identify an item from keyword analysis in accordance with embodiments described above. The use of keyword analysis may be particularly advantageous in allowing interoperability between disparate systems used in different independent stores which may use different product identifiers. Additionally or alternatively, the record may also comprise key parameters or similar item metadata which may be used to identify when a particular item is similar to other selected items, in accordance with embodiments described above.

Figure 18:
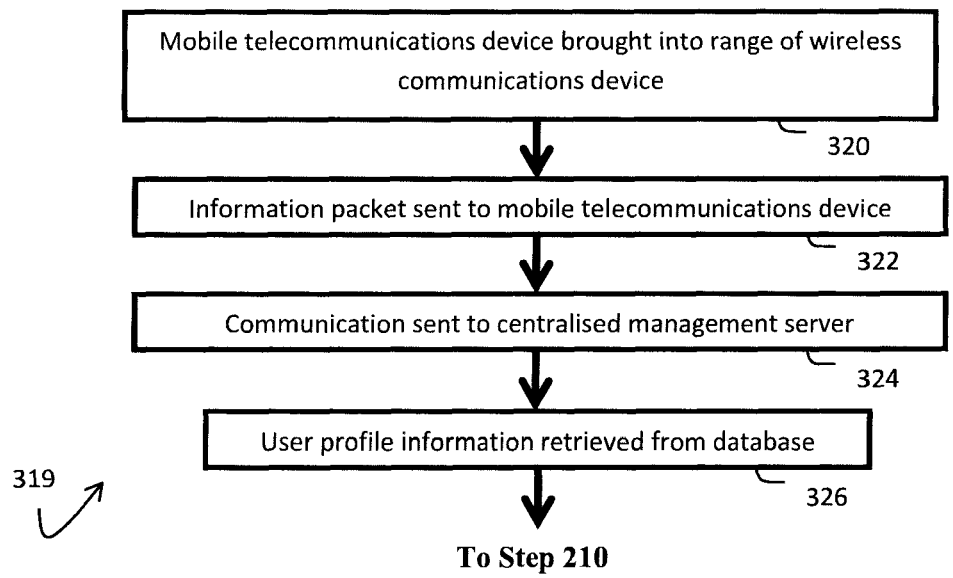
FIG. 18 is a flow diagram, showing a method of operation of an availability notification system in use with the centralised management system of FIG. 16.

Turning now to FIG. 18, there is shown a method of operation 319 of an availability notification system in use with the centralised management system of FIG. 16. The method 319 begins when, at Step 320, a user's mobile telecommunications device 156 is brought within the range of a wireless communications device located within one of the stores included in the centralised management system (the proximate store). The appropriate range may be decided in accordance with the embodiment previously described in FIG. 13. Once a mobile telecommunications device 156 is brought within range, an information packet is sent, at Step 322, to the device 156 in a manner analogous to the method of operation described in reference to FIG. 13. Upon receipt of the information packet, the mobile telecommunications device 156 then sends, at Step 324, a communication to the centralised management server 270. This communication may be configured to provide user identification data relating to the owner of the mobile telecommunications device 156, in accordance with any one of the embodiments described above. The communication may also be configured to provide information regarding the store location of the wireless communications device which the user is in proximity to.

Once this communication has been retrieved, the centralised management server 270 then retrieves, at Step 326, user profile information associated with the user identification data provided in the communication. The user profile information may comprise desired items of interest, in accordance with descriptions given above. Furthermore, the information may also comprise a list of stores which the user has previously entered or purchased items from which are managed by the centralised management server. Once this information has been retrieved, the method 319 then proceeds in accordance with Step 210 of FIG. 13.

Figure 19:
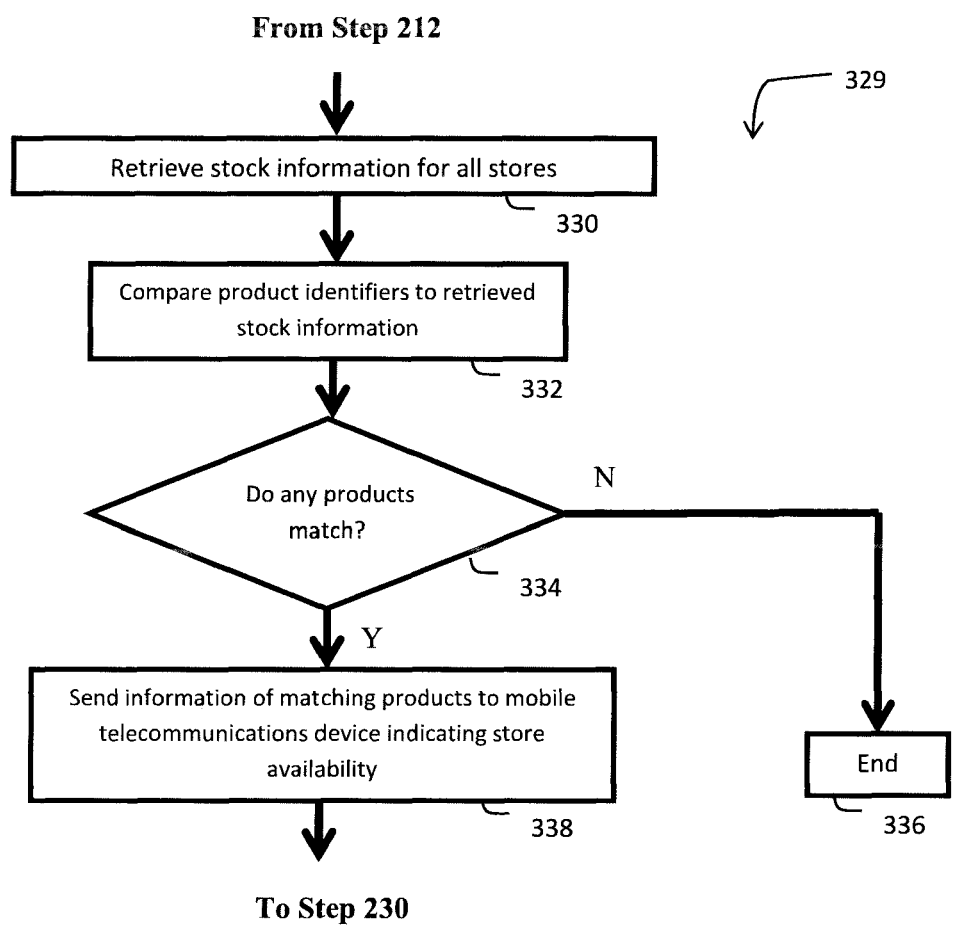
FIG. 19 is a flow diagram, showing a method of operation of determining whether any of the user's desired items are in stock in any of the stores managed by the centralised management system of FIG. 16.

Turning to FIG. 19, there is provided a method of operation 329 of determining whether any of the user's desired items are in stock in any of the stores managed by the centralised management system of FIG. 16. This method of operation 329 is intended to be used as part of an availability notification system in use with the centralised management system of FIG. 16.

The method 329 begins when the product identifiers of a user's desired items are retrieved from the product identifier database 164, as shown in Step 212 of FIG. 13. In an embodiment where the system is configured to also notify a user of similar items which are available in accordance with embodiments described above, the retrieved product identifiers may also comprise those of the identified similar items. Once the product identifiers have been retrieved, the stock information from all stores is retrieved, at Step 330, from the central stock information database 276. In some embodiments, the system may be configured to only retrieve the stock information from stores within a predetermined distance of the initial user, where this predetermined distance (threshold distance) determines the scope of the stores which may be considered to be 'neighbouring.' This predetermined distance may be set by an administrator of the central management system, and could be a walking distance (as described previously). Additionally or alternatively, this distance may be determined by the user themselves, and the specified distance may be stored as part of the user profile information which is retrieved earlier in the process.

Once the stock information is retrieved, the product identifiers of the desired (and/or similar) items are compared, at Step 332, to the retrieved stock information. It is then determined, at Step 334, whether any of the products match. If they do not, the method proceeds to Step 336, where the method ends and awaits another mobile telecommunications device 156 to be brought within range of the wireless communications device. In some unseen embodiments, if it is determined that there are no matching product identifiers, before the method 329 ends the central management server 270 may be configured to retrieve data which links to an online retail environment where the desired items are purchasable. The central management server 270 may then transmit this data to the user's mobile telecommunications device 156. Once this data is received, the data may be configured to cause a notification to be displayed on the user's mobile telecommunications device 156 which indicates that their desired products are not available at any nearby store, but that they can be purchased on the online environment by using the provided link. Furthermore, the central management server 270 may also be configured to determine if there are any stores with availability outside of the predetermined range discussed above and if there are, transmit a notification indicating such availability to the user's mobile telecommunications device 156.

If however it is determined at Step 334 that there are one or more matching product identifiers, the method of operation 329 instead proceeds to send, at Step 338, the matching product data to the user's mobile telecommunications device 156 to inform them that the relevant desired item(s) of the user are available in a store within the predetermined distance discussed above, either the proximate or neighbouring stores. This information may for example be sent in the form of a push notification, where once the notification is received by the mobile telecommunication device 156, it causes the SFP application 10A to open a dialogue box on the screen of the device which displays the items available in the proximate store. The notification may also comprise causing the mobile telecommunications device 156 to vibrate, alerting the user that they have received a notification. In addition to letting the user know that a particular item or items is/are available, the information displayed may also indicate which store the product is available in. The notification may also be configured to provide directions to the available store, either within the SFP application 10A itself, or via an external link to a map software application.

In additional embodiments, the centralised management server 270 may also be configured to allow a user to request that a desired item be prepared and stored in any of the stores connected to the centralised management system. This operates in an analogous manner to the method described in FIG. 14, where the requests are sent to the centralised management server 270, and the centralised management server 270 then subsequently determines the store and boutique assistant device which the request should be passed to. In this case, the present method of operation proceeds to Step 230 of FIG. 14.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention.

One embodiment described herein includes an interactive environmental control system for controlling an environment within a clothes changing cubicle to test the functionality of items in use in the cubicle, the control system comprising: an interaction controller arranged to receive a proximity signal indicating the presence of an item within the clothes changing cubicle, the proximity signal including a unique identifier associated with the item; the interaction controller being arranged to use the unique identifier to retrieve pre-stored environmental information associated with a function of the item and to generate a control signal specifying environmental control parameters associated with the pre-stored environmental information; one or more environment changing devices which are each arranged to alter a parameter of a current environment within the clothes changing cubicle to test the functionality of the item; and a device controller operatively coupled to the one or more environment changing devices and arranged to receive the control signal from the interaction controller and to control the one or more environment changing devices to alter the environment within the changing cubicle according to the specified environmental control parameters.

The item may comprise an article of clothing or other accessory having a unique product code. The item may comprise an RFID tag provided with an article of clothing or other accessory. Alternatively the item may comprise a mobile telecommunications device and the unique identifier may comprise a unique identifier of the user of the mobile device.

In some embodiments the interaction controller comprises a user identity determining module arranged to interact with a user identifier item to determine the identity of the user present within the clothes changing cubicle and to retrieve data relating to the identified user from a data store.

The interaction controller may further comprise a network communications transceiver for communicating with a remotely located server.

In some embodiments, the interaction controller comprises a location determining module arranged to track the location of the item and to indicate when the item is located within the clothes changing cubicle. Also the interaction controller can be arranged to determine location coordinates of the item using information received from the remotely located server via the network communications transceiver.

In either of these cases, the interaction controller can be arranged to communicate information related to the item with mobile telecommunications devices via the network communications transceiver. Preferably, the pre-stored environmental information comprises a user profile specifying at least one article of clothing or other accessory.

In some embodiments, the location determining module is arranged to determine location coordinates of the item using local triangulation techniques using locally provided beacons 32. Alternatively, the interaction controller comprises a proximity sensor within the cubicle for sensing the proximity of a recognisable interaction element provided with the item.

In some embodiments, the interaction controller comprises an interactive mirror having a display portion for displaying information to the user and a touch screen overlaying the display portion to permit user interaction with the displayed information.

Advantageously, the interaction controller may further comprise a body scanner for scanning the body of a user when the user and the item are present in the clothes changing cubicle, the interaction controller being arranged to determine the size of the user using the output of the body scanner.

The interaction controller may comprise a mobile telecommunications device and a downloadable application running on the mobile telecommunications device.

In some embodiments, the one or more environment changing devices comprise a display screen for displaying a background scene and the device controller is arranged to change the background scene to a predetermined scene associated with the functionality of the item or a profile associated with the functionality of the item.

In some embodiments, the one or more environment changing devices comprises a speaker for providing background audio and the device controller is arranged to change the background audio to a predetermined audio associated with the item or a profile associated with the item.

In some embodiments, the one or more environment changing devices comprises a speaker for providing an audio recording suitable for determining the functionality of the item and the device controller is arranged to change the volume of the audio recording to a predetermined level which has been determined as suitable for determining the functionality of the item.

In some embodiments, the one or more environment changing devices comprises an aroma generator for providing a scent or smell and the device controller is arranged to cause the aroma generator to generate an aroma or small associated with the item or a profile associated with the item.

Preferably, the one or more environment changing devices comprises a temperature control unit for providing change in the temperature of the changing cubicle and the device controller is arranged to cause the temperature control unit to change the temperature of the changing cubicle to a temperature associated with the functionality of the item or a profile associated with the functionality of the item. In some embodiments the temperature control unit comprises an air conditioning unit.

In some embodiments, the one or more environment changing devices comprises a sprinkler for providing a liquid spray of water into the changing cubicle and the device controller is arranged to cause the sprinkler to emit the liquid spray to simulate a raining environment associated with the functionality of the item or a profile associated with the functionality of the item.

In some embodiments, the one or more environment changing devices comprises a treadmill for providing a moving surface for the user and the device controller is arranged to cause the treadmill to move to simulate a walking or running environment associated with the item or a profile associated with the item.

There is also described a method of controlling an environment to test the functionality of items in use within a clothes changing cubicle, the method comprising: receiving a proximity signal indicating the presence of an item within the clothes changing cubicle, the proximity signal including a unique identifier associated with the item; using the unique identifier to retrieve pre-stored environmental information associated with a function of the item; generating a control signal specifying environmental control parameters associated with the pre-stored environmental information; providing one or more environment changing devices which are each arranged to alter a parameter of a current environment within the clothes changing cubicle to test the functionality of the item; and using the control signal to control one or more environment changing devices to alter the environment within the changing cubicle according to the specified environmental control parameters.

As has been described previously, according to one aspect of the present embodiments, there is provided a system for automatically determining the location of a user-specified item within a plurality of possible independent inventory systems, each inventory system being located in a different unique geographic location, the system comprising: a user profile database comprising a plurality of user records associated with a plurality of different users, at least one of the user records comprising a list of items that are required by a corresponding user; an availability database for providing information relating to the availability of specific items at each of the plurality of independent inventory systems, a central server for interacting with a mobile telecommunications device, the server comprising: an updating engine for regularly updating the availability database with supply or usage information received from the plurality of independent inventory systems; the supply or usage information regarding the number of items currently available at the geographic location of each inventory system; and a processing engine for receiving a request from the mobile telecommunications device from the geographical location associated with one of the independent inventory systems, the request comprising a current location identifier and a user identifier, the processing engine being arranged to: search the user profile database for a matching user record corresponding to the user identifier, retrieve from the matching user record, the list of items for that user; search the availability database using a unique identifier of each item of the list and the current location identifier to determine whether the inventory system at the current location of the mobile telecommunications device has any of the items on the list; and transmit a reply to the request, the reply comprising information about which items on the list are present at the current location of the mobile telecommunications device.

In certain embodiments the system further comprises an item database storing a plurality of item identifiers, the item database being arranged to enable the use of keyword descriptors of an item to look up a corresponding universal identifier of that item which can be used to identify the item in any of a plurality of different local inventory systems; wherein the processing engine is configured to determine the unique identifier of an item on the list by querying the item database using keyword descriptors of the item and to retrieve the corresponding universal identifier of the item.

The list of items may comprise a list of composite descriptors of the items, each composite descriptor comprising a user-selected type of item and a user-specific predetermined size of the user.

If the processing engine determines that none of the items on the user's wish list are available at the current location, the processing engine may be configured to determine the independent inventory system which has at least one of the items on the user's wish list and has an associated geographic location closest to the current location of the mobile telecommunications device; and transmit a reply to the request which identifies the location of this independent inventory system.

Alternatively if the processing engine determines that none of the items on the user's wish list are available at the current location, the processing engine can be configured to: determine one or more independent inventory systems which have at least one of the items on the user's wish list and have an associated geographic location within a user-determined threshold of the current location of the mobile telecommunications device; and transmit a reply to the request which identifies the locations associated with each of these independent inventory systems.

As a further alternative, if the processing engine determines that none of the items on the user's wish list are available at the current location or locations within a predetermined range of the current location, the processing engine may be configured to transmit within the reply information describing a website where the items can be ordered for delivery. For example, the reply information may comprise a URL of a website.

Preferably in certain embodiments, the location identifier is an identifier of the geographic location of the mobile device when the request is sent or is an identifier of the independent inventory system associated with a unique location.

In some embodiments the system further comprises a product analysis engine, the product analysis engine being arranged to compare a first item on the list with other different items and determine at least one different item which can be linked to the first item on the list. The product analysis engine may be arranged to determine the at least one different item as being similar in style, shape, colour, texture and/or pattern to the first item. Also the product analysis engine may be arranged to determine the at least one different item as being complementary to the first item, the complementary relationship between the items being predetermined. In some of the embodiments the processing engine is configured to transmit within the reply information, images of and/or data describing the at least one different item. This can assist the user to determine more quickly the items that they wish to know more about or even in some embodiments ask to be reserved for them to try on.

It is to be appreciated that in some embodiments it may be more convenient for at least one of the plurality of possible independent inventory systems to comprise a first part of the system at the corresponding geographic location and a second part of the system which is in operable communication with the first part at a remote location. This distribution of processing resources may be useful when the inventory system covers multiple sites each requiring their own local inventory management as well as central coordinated management.

Where the above described system is used in combination with a mobile telecommunications device being controlled by a downloaded application, the downloaded application can be arranged to configure the mobile telecommunications device to interact with an independent inventory system to register a current location of the mobile telecommunications device.

In this case, the mobile telecommunications device can be conveniently arranged to receive a push notification via a short-range communications channel when the mobile telecommunications device is within a predetermined distance of the location associated with the independent inventory system, the notification including an identifier of the location or the inventory system unique to that location.

In certain embodiments the mobile telecommunications device is arranged to display the information about which items on the user's list are present at the current location of the mobile telecommunications device and to enable user selection of one of more of the items, the user selection triggering sending of a preparation communication to the inventory system associated with the current location, the preparation communication identifying one or more of the user-selected items which have been indicated as being available at the current location.

The above mobile telecommunications device, which can be any devices such as a portable mobile telecommunications device such smartphone or tablet for example, in combination with the above described system can also be combined with a remotely-configurable changing room lock. In this case, the lock of one embodiment comprises a communications module for communicating with the inventory system and/or the mobile telecommunications device, and is arranged to be responsive to receipt of the preparation communication or a control instruction derived therefrom, to lock the changing room once the items have been placed therein, to generate a unique unlock code and to provide the unlock code for transmission back to the mobile telecommunications device, the unique unlock code being useable by the mobile device or user of the device to unlock the locked changing room to provide access to the user-selected items once the mobile device is proximate the changing room.

The present embodiment also describe a method of automatically determining the location of a user-specified item within a plurality of possible independent inventory systems, each inventory system being located in a different unique geographic location, the method comprising: providing a user profile database comprising a plurality of user records associated with a plurality of different users; at least one of the user records comprising a list of items that are required by a corresponding user; providing an availability database comprising information relating to the availability of specific items at each of the plurality of independent inventory systems; interacting with a mobile telecommunications device, the interaction comprising: regularly updating the availability database with supply or usage information received from the plurality of independent inventory systems; the supply or usage information regarding the number of items currently available at the geographic location of inventory system; receiving a request from the mobile telecommunications device from the geographical location associated with one of the independent inventory systems, the request comprising a current location identifier and a user identifier; searching the user profile database for a matching user record corresponding to the user identifier; retrieving from the matching user record the list of items for that user; searching the availability database using a unique identifier of each item of the list and the current location identifier to determine whether the inventory system at the current location of the mobile telecommunications device has any of the items on the list; and transmitting a reply to the request, the reply comprising information about which items on the user's list are present at the current location of the mobile telecommunications device.

Another embodiment is directed to a preparation and reservation system for selecting items for close inspection in a secure changing room. The system comprises: a receiver for receiving an instruction from a mobile telecommunications device for selected items available at a store location; the receiver being arranged to display information to a store assistant regarding the selected items identified in the instruction; a changing room locking device for controlling the operation of a lock on a changing room door at the store location, the locking device being configured, subsequent to the selected items being placed in the changing room and in response to receiving an activation command, to lock the door and generate a one-time unlocking code for unlocking the locking device; and a transmitter for communicating the generated one-time unlocking code to the mobile telecommunications device for subsequent use by a user of the mobile telecommunications device to unlock the locked changing room door.

The instruction may in some embodiments include a biometric identifier of a user of the mobile device and the one-time unlock code generated by the changing room locking device can include at least a portion which requires the biometric data of the mobile device user at the changing room door to unlock the same.

Alternatively or in combination, the configurable changing room locking device can in some embodiments include a Near Field Communications (NFC) sensor and the generated one-time unlock code can be arranged to be provided to an NFC mobile device sensor of the mobile telecommunications device to enable the changing room door to be unlocked by proximity of the NFC mobile device sensor to the NFC sensor of the changing room locking device.

In some embodiments the combination described above further comprises a changing room sensor operatively coupled to the changing room locking device, the changing room sensor being configured to detect the presence of the user-selected items within the changing room and to only permit locking of the changing room door when the user selected items have been placed within the changing room and the room is unoccupied. This clearly enables automated locking but prevents assistants from being locked into the changing room/cubicle. In some embodiments the changing room sensor generates the activation command.

Accordingly the present disclosure also extends to a method of preparation and reservation of selecting items for close inspection in a secure changing room, the method comprising: receiving an instruction from a mobile telecommunications device for selected items available at a store location; displaying information to a store assistant regarding the selected items identified in the instruction; providing a changing room locking device for controlling the operation of a lock on a changing room door at the store location; receiving an activation command at the changing room locking device subsequent to the selected items being placed in the changing room and in response thereto operating the locking device to lock the door; generating a one-time unlocking code for unlocking the changing room door via the operation of the changing room locking device; transmitting the generated one-time unlocking code to the mobile telecommunications device; and unlocking the locked changing room door via the changing room locking device when the user of the mobile device or the mobile device is in close proximity to the changing room locking device and once the unlocking code has been received from the user or the user's mobile telecommunications device.

Some embodiments are directed to an item location determining system within a geographical area of a retail store, the system comprising: a plurality of item position determining sensors distributed about the geographical area, each of the plurality of item positions determining sensors being configured in use to detect the presence of a specific item at a sensor location and to transmit information about the item and the location within the geographical area to a mapping engine; a mapping engine for determining the locations of items within the geographical area using the information received from the item positioning sensors and for associating these locations with a floorplan of the geographical area, the floorplan including a plurality of user-accessible pathways which can be traversed to access any of the items located at an item position sensor; at least three local telecommunications beacons positioned about the geographical area in spaced-apart locations, the local telecommunications beacons being configured in use to transmit and receive location-determining information of a mobile telecommunications device provided within the geographical area; a local position determining engine operatively coupled to the plurality of local telecommunications beacons, the local positioning engine being arranged to: determine from the signals received from the plurality of local telecommunications beacons, a current position of the mobile telecommunications device within the geographical area; and provide the current position of the mobile telecommunications device within the geographical area to the mapping engine; wherein the mapping engine is configured to: receive an item location request from the mobile telecommunications device for a user-specified item and to determine the location of that item within the geographical area of the store; and transmit to the mobile telecommunications device the location of the user-specified item within the geographical area together with the current position of the mobile telecommunications device within the geographical area such that the mobile device can present on an image of the floorplan the user-specified item location, the current position of the mobile telecommunications device and a route from the current positions to the location of the user-specified item along a pathway of the floorplan.

In this embodiment of the item location determining system, the mapping engine is configured to: receive an item location request from the mobile telecommunications device for a plurality of user-specified items and to determine the location of each of the user-specified items within the geographical area of the store; and transmit to the mobile telecommunications device the location of each user-specified item within the geographical area together with the current position of the mobile telecommunications device within the geographical area such that the mobile device can present on an image of the floorplan the plurality of user-specified item locations, the current position of the mobile telecommunications device and a route from the current position to any of the locations of the user-specified items along one or more pathways of the floorplan.

Preferably the local positioning engine is arranged to: determine from the signals received from the plurality of local telecommunications beacons, a current position of an assistant mobile telecommunications device within the geographical area; and provide the current position of the assistant mobile telecommunications device to the mapping engine; wherein the mapping engine is configured to transmit to the mobile telecommunications device the current position of the assistant mobile telecommunications device within the geographical area such that the mobile telecommunications device can present on an image of the floorplan the current position of the assistant mobile telecommunications device. In this case the mapping engine can be arranged to determine the identity of the assistant mobile telecommunications device; retrieve further information relating to the person associated with the assistant mobile telecommunications device and transmit the further information to the mobile telecommunications device. This can help the user to determine whether the assistant is suitable for the help that they may require. The further information may comprise information pertaining to the experience, skills and/or current status of the assistant. Also in this case the item location request may comprise a user identifier and the mapping engine is configured to use the user identifier to retrieve a user profile associated with the user identifier and transmit the user profile to the assistant mobile telecommunications device together with the current position of the mobile telecommunications device of the user within the geographical area. This can help the assistant to determine haw best to help the user.

In these embodiments the mapping engine can also be configured to provide to the mobile telecommunications device other points of user interest where user interaction can occur (such as changing rooms, point of sale desks, toilets etc, such that the mobile telecommunications device can present these on the image of the floorplan.

In some embodiments, the local position determining engine is arranged to use timestamps with communications between the beacons and the mobile telecommunications device to determine the distance of the mobile telecommunications device from each of the plurality of beacons.

The present disclosure extends to an interactive routing system for use within a geographical area of a retail store, the interactive routing system comprising an item locating system as described above and a mobile telecommunications device, the mobile telecommunications device having a downloadable application for configuring operation of the device to communicate with the item locating system and to receive the location of the user-specified item within the geographical area together with the current position of the mobile telecommunications device within the geographical area; the mobile telecommunications device being configured by the downloadable application to display an image of the floorplan of the geographical area of the retail store and to present on the image of the floorplan the user-specified item location, the current position of the mobile telecommunications device and a route from the current position to the location of the user-specified item along a pathway of the floorplan. In some embodiments the downloadable application is configured to display additional information on the floorplan regarding a location and/or status of a mobile telecommunication device of an assistant.

The present disclosure also includes a method of determining a location of an item within a geographical area of a retail store, the method comprising: detecting the presence of a specific item at a sensor location using one of a plurality of item position determining sensors distributed about the geographical area; transmitting information about the item and the location within the geographical area to a mapping engine; determining the locations of items within the geographical area using the information received from the item positioning sensors for association with a floorplan of the geographical area, the floorplan including a plurality of user-accessible pathways which can be traversed to access any of the items located at an item position sensor; using at least three local telecommunications beacons positioned about the geographical area in spaced apart locations; configuring the local telecommunications beacons in use to transmit and receive location-determining information of a mobile telecommunications device provided within the geographical area; determining from the signals received from the plurality of local telecommunications beacons, a current position of the mobile telecommunications device within the geographical area; providing the current position of the mobile telecommunications device within the geographical area to the mapping engine; receiving at the mapping engine an item location request from the mobile telecommunications device for a user-specified item; determining the location of that item within the geographical area of the store; and transmitting to the mobile telecommunications device the location of the user-specified item together with the current position of the mobile telecommunications device within the geographical area, such that the mobile device can present on an image of the floorplan the user-specified item location, the current position of the mobile telecommunications device and a route from the current position to the location of the user-specified item along a pathway of the floorplan.

Having described the present invention with reference to several specific embodiments, it is to be appreciated that the skilled person will be capable of applying variations, modifications and/or additions other than those specifically described herein and it is to be understood that the present invention includes all such variations, modifications and/or additions, which fall within the spirit and scope of the following claims.

The invention claimed is:

1. A system for automatically determining a location of a user-specified item within a plurality of independent inventory systems, each inventory system being located in a unique geographic location, the system comprising:
   a user profile database comprising a plurality of user records associated with a plurality of different users, at least one of the user records comprising a user list of items that are required by a corresponding user;
   an availability database for providing information relating to availability of specific items at each of the plurality of independent inventory systems; and
   a central server for interacting with a mobile telecommunications device, the server comprising:
      an updating engine for regularly updating the availability database with supply or usage information received from the plurality of independent inventory systems; the supply or usage information regarding a number of items currently available at the unique geographic location of each inventory system; and
      a processing engine for receiving a request from the mobile telecommunications device from the unique geographic location associated with one of the independent inventory systems, the request comprising a current location identifier and a user identifier, the processing engine being arranged to:
         search the user profile database for a matching user record corresponding to the user identifier;
         retrieve from the matching user record, the user list of items;
         search the availability database using a unique identifier of each item of the user list of items and the current location identifier to determine whether the inventory system at the current location of the mobile telecommunications device has any of the items on the user list of items; and
         transmit a reply to the request, the reply comprising information about which items on the list are present at the current location of the mobile telecommunications device;
   the system, further comprising a remotely-configurable changing room lock, the lock comprising a communications module for communicating with at least one of the inventory system and the mobile telecommunications device, and being arranged to be responsive to receipt of a preparation communication or a control instruction derived therefrom, to lock an associated changing room once the items have been placed therein, to generate a unique unlock code and to provide the unlock code for transmission back to the mobile telecommunications device, the unique unlock code being useable by the mobile device or user of the device to unlock the locked associated changing room to provide access to user-selected items once the mobile telecommunications device is proximate to the associated changing room.

2. The system of claim 1, further comprising an item database storing a plurality of item identifiers, the item database being arranged to enable use of keyword descriptors of an item to look up a corresponding universal identifier of that item which can be used to identify the item in any of a plurality of different local inventory systems;

wherein the processing engine is configured to determine the unique identifier of an item on the list by querying the item database using keyword descriptors of the item and to retrieve the corresponding universal identifier of the item.

3. The system of claim 1, wherein the list of items comprises a list of composite descriptors of the items, each composite descriptor comprising a user-selected type of item and a user-specific predetermined size of the user.

4. The system of claim 1, wherein if the processing engine determines that none of the items on the user list of items are available at the current location, the processing engine is configured to:

determine the independent inventory system which has at least one of the items on the user list of items and has an associated geographic location closest to the current location of the mobile telecommunications device; and transmit a reply to the request which identifies the location of this independent inventory system.

5. The system of claim 1, wherein if the processing engine determines that none of the items on the user list of items are available at the current location, the processing engine is configured to:

determine one or more independent inventory systems which have at least one of the items on the user list of items and have an associated geographic location within a user-determined threshold of the current location of the mobile telecommunications device; and transmit a reply to the request which identifies the locations associated with each of these independent inventory systems.

6. The system of claim 1, wherein if the processing engine determines that none of the items on the user list of items are available at the current location or locations within a predetermined range of the current location, the processing engine is configured to transmit within the reply information describing a website where the items can be ordered for delivery.

7. The system of claim 6, wherein the reply information comprises a URL of a website.

8. The system of claim 1, wherein the current location identifier is an identifier of the geographic location of the mobile telecommunications device when the request is sent or is an identifier of the independent inventory system associated with a unique location.

9. The system of claim 1, further comprising a product analysis engine, the product analysis engine being arranged to compare a first item on the list of items with other different items and determine at least one different item which can be linked to the first item on the list of items.

10. The system of claim 9, wherein the product analysis engine is arranged to determine the at least one different item as being similar in style, shape, colour, texture and/or pattern to the first item.

11. The system of claim 9, wherein the product analysis engine is arranged to determine the at least one different item as being a complementary relationship to the first item, the complementary relationship between the items being predetermined.

12. The system of claim 9, wherein the processing engine is configured to transmit within the reply information, images of and/or data describing the at least one different item.

13. The system of any of claim 1, wherein at least one of the independent inventory systems comprises a first part of the system at the corresponding geographic location and a second part of the system which is in operable communication with the first part at a remote location.

14. The system of claim 1, further comprising the mobile telecommunications device, the mobile telecommunications device being controlled by a downloaded application, wherein the downloaded application is arranged to configure the mobile telecommunications device to interact with an independent inventory system to register a current location of the mobile telecommunications device.

15. The system of claim 14, wherein the mobile telecommunications device is arranged to receive a push notification via a short-range communications channel when the mobile telecommunications device is within a predetermined distance of the location associated with the independent inventory system, the notification including an identifier of the location or the inventory system unique to that location.

16. The system of claim 14, wherein the mobile telecommunications device is arranged to display the information about which items on the user list are present at the current location of the mobile telecommunications device and to enable user selection of one of more of the items, the user selection triggering sending of the preparation communication to the inventory system associated with the current location, the preparation communication identifying one or more of the user-selected items which have been indicated as being available at the current location.

17. The system of claim 1, further comprising a changing room sensor operatively coupled to the changing room lock, the changing room sensor being configured to detect a presence of the user-selected items within the associated changing room and to only permit locking of the changing room lock when the user-selected items have been placed within the associated changing room and the associated changing room is unoccupied.

* * * * *